US007403983B2

(12) United States Patent
Ueno et al.

(10) Patent No.: US 7,403,983 B2
(45) Date of Patent: Jul. 22, 2008

(54) INFORMATION PROCESSING APPARATUS FOR CONTROLLING TRANSMISSION AND RECEPTION OF ELECTRONIC MAIL WHEN AN ATTACHMENT EXCEEDS A PREDETERMINED SIZE

(75) Inventors: Hiroshi Ueno, Tokyo (JP); Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 469 days.

(21) Appl. No.: 09/879,042

(22) Filed: Jun. 13, 2001

(65) Prior Publication Data
US 2002/0016823 A1 Feb. 7, 2002

(30) Foreign Application Priority Data
Jun. 14, 2000 (JP) ............................. 2000-178728

(51) Int. Cl.
G06F 15/173 (2006.01)
(52) U.S. Cl. .................... 709/223; 709/206; 709/217
(58) Field of Classification Search .................. 707/10, 707/204; 709/203, 206, 217, 223; 358/1.14; 710/20; 713/201; 455/566
See application file for complete search history.

(56) References Cited

U.S. PATENT DOCUMENTS

| 5,548,789 | A | * | 8/1996 | Nakanura | 709/206 |
|---|---|---|---|---|---|
| 5,764,899 | A | | 6/1998 | Eggleston et al. | |
| 5,771,355 | A | * | 6/1998 | Kuzma | 709/232 |
| 5,781,901 | A | * | 7/1998 | Kuzma | 707/10 |
| 5,813,009 | A | * | 9/1998 | Johnson et al. | 707/100 |
| 5,873,085 | A | * | 2/1999 | Enoki et al. | 707/10 |
| 5,878,398 | A | * | 3/1999 | Tokuda et al. | 705/8 |
| 5,944,794 | A | * | 8/1999 | Okamoto et al. | 709/225 |
| 6,275,850 | B1 | * | 8/2001 | Beyda et al. | 709/206 |
| 6,330,068 | B1 | * | 12/2001 | Matsuyama | 358/1.14 |
| 6,408,344 | B1 | * | 6/2002 | Sakai | 710/20 |
| 6,505,236 | B1 | * | 1/2003 | Pollack | 709/206 |
| 6,584,466 | B1 | * | 6/2003 | Serbinis et al. | 707/10 |
| 6,684,088 | B1 | * | 1/2004 | Halahmi | 455/566 |
| 6,754,696 | B1 | * | 6/2004 | Kamath et al. | 709/213 |
| 6,779,178 | B1 | * | 8/2004 | Lloyd et al. | 717/174 |
| 6,839,741 | B1 | * | 1/2005 | Tsai | 709/217 |
| 7,149,777 | B1 | * | 12/2006 | Rhee | 709/206 |
| 2002/0016818 | A1 | * | 2/2002 | Kirani et al. | 709/203 |
| 2002/0049852 | A1 | * | 4/2002 | Lee et al. | 709/231 |
| 2002/0056123 | A1 | * | 5/2002 | Liwerant et al. | 725/87 |

* cited by examiner

Primary Examiner—William Vaughn, Jr.
Assistant Examiner—Greg Bengzon
(74) Attorney, Agent, or Firm—Oblon, Spivak, McClelland, Maier & Neustadt, P.C.

(57) ABSTRACT

The CPU of a mail server accepts input of electronic mail. The CPU judges whether or not the mail has an attached file of a data capacity larger than a predetermined threshold value. If the mail is judged to have such an oversized attached file, the CPU generates key information (or a URL and a password). Then, the CPU writes the key information in association with a name of the attached file to a file ID table in a storage device. The CPU replaces the attached file with the key information. And, the CPU increments by 1 a counter value (N) representative of the number of times an attached file storage service has been used (N=N+1) The CPU outputs the attached file to a user-wise attached file storage area for storage therein. When the mail is not judged to have any oversized attached file or when the attached file is stored in the user-wise attached file storage, the CPU sends the electronic mail to a destination mail server.

7 Claims, 14 Drawing Sheets

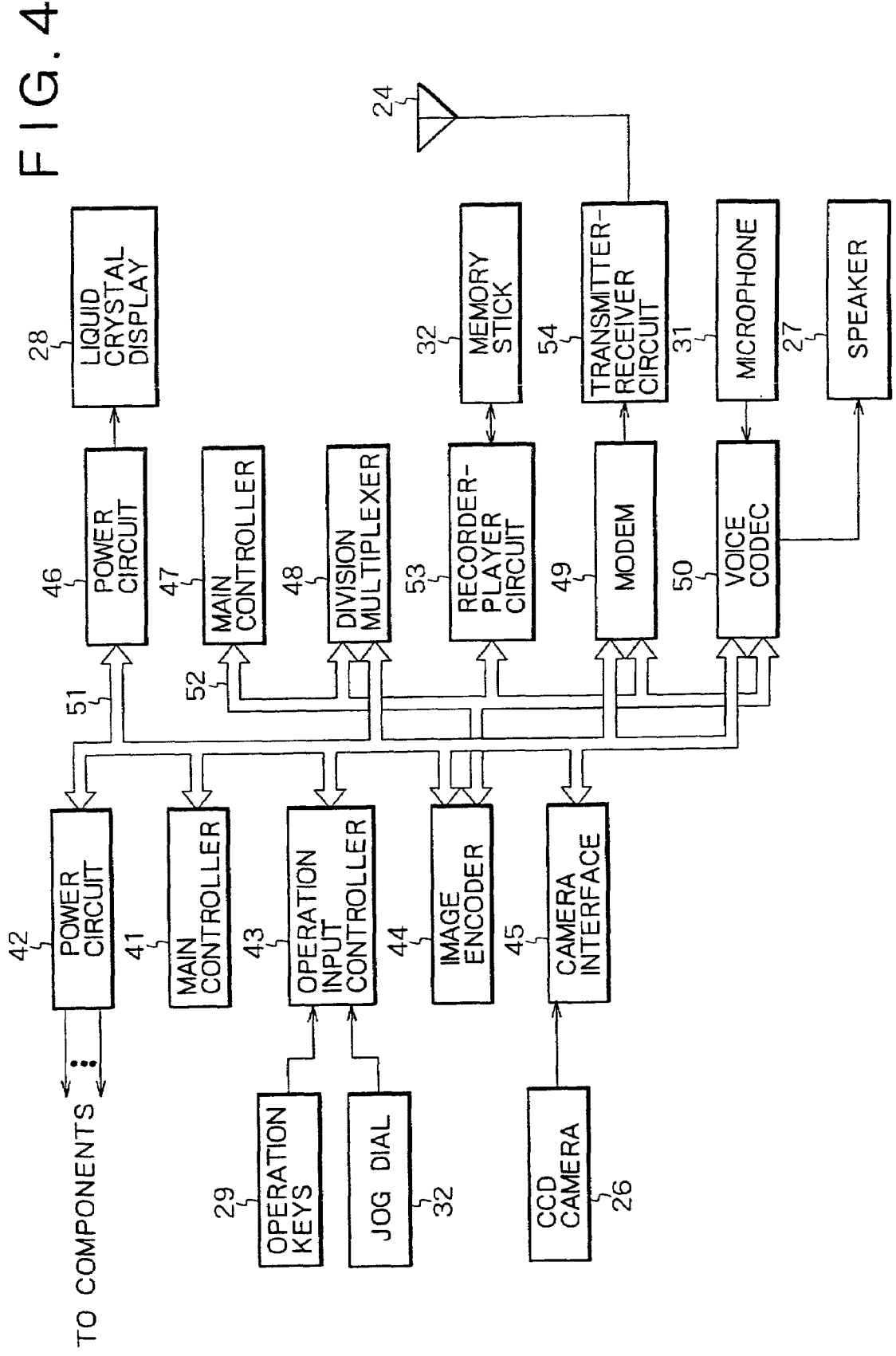

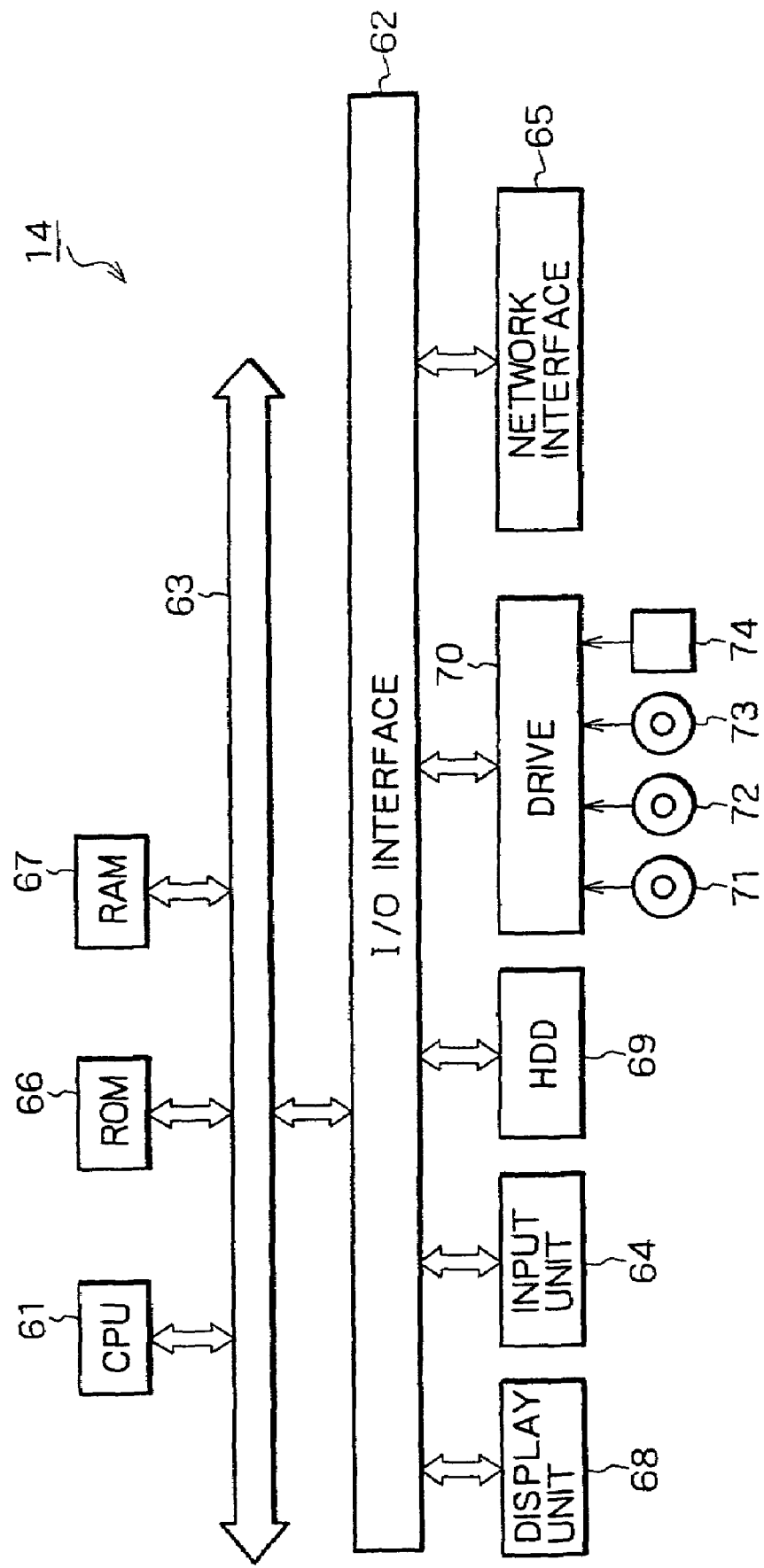

FIG.6A

| KEY | ATTACHED FILE |
|---|---|
| XXX012 | ABC001.JPG |
| YYY789 | XYZ501.MPG |
| ⋮ | ⋮ |

FIG.6B

| URL | PASSWORD | ATTACHED FILE |
|---|---|---|
| WWW.SXXX.YYY.html | XXX013 | ABC001.JPG |
| WWW.SXXX.YYY.html | YYY790 | XYZ501.MPG |
| ⋮ | ⋮ | ⋮ |

INFORMATION PROCESSING APPARATUS FOR CONTROLLING TRANSMISSION AND RECEPTION OF ELECTRONIC MAIL WHEN AN ATTACHMENT EXCEEDS A PREDETERMINED SIZE

BACKGROUND OF THE INVENTION

The present invention relates to an information processing apparatus, an information processing method, an information management system, and a program storage medium. More particularly, the invention relates to an information processing apparatus, an information processing method, an information management system, and a program storage medium adapted advantageously to the sending and receiving of electronic mail together with an attached file of a large capacity illustratively by use of PDAs (Personal Digital (Data) Assistants), cellular phones and other data terminals equipped with a limited storage capacity each.

Where data other than characters (data, image data or audio data generated by a specific application program) are to be sent by use of electronic mail, it is customary to transmit such data as a file attached to the mail. It is also common practice to store in advance large quantities of data in a server accessible over a network so that a receiving party, given authentication key information or a password, may gain access to the data in the appropriate server on the network.

A difficulty has been experienced when small, portable data terminals such as PDAs or cellular phones are used to exchange data as attachments to electronic mail. Because these terminals have only a limited storage capacity, it is difficult for them to receive electronic mail together with its attached file of a large capacity.

Where a data provider places data beforehand in a server for data exchanges over the network, the data provider must go through complicated procedures: offered data are first stored in the appropriate server, and then authentication key information or a password is generated and passed on to a receiving party in advance by electronic mail or other suitable means so that the receiving party may legitimately gain access to the server and to the data therein. If there are multiple receiving parties, the data provider must generate an authentication key or a password to each of the parties involved.

It is possible alternatively to store data in the server in such a manner that the data may be accessed by anyone. Although this option eliminates chores involved in authentication key management, security is bound to be lax because everyone can gain access to the data.

SUMMARY OF THE INVENTION

An object of the present invention is to provide an information processing apparatus, an information processing method, an information management system, and a program storage medium capable of, if the data capacity of a file attached to electronic mail is judged to be equal to or larger than a predetermined capacity, storing the attached file and transmitting the mail along with either information allowing the stored attached file to be received part by part or information permitting a receiving party to browse contents of the attached file, so that small-sized portable data terminals such as PDAs and portable telephones may receive the mail together with the attached file of a large capacity without compromising data security while charges for such services are duly collected.

According to a first aspect of the present invention, there is provided an information processing apparatus including first input controlling means for controlling input of electronic mail; first judging means for judging whether or not first information attached to the electronic mail has a capacity larger than a first capacity; generating means for generating second information corresponding to the first information; storage controlling means for, if the first judging means judges that the first information attached to the electronic mail has a capacity larger than the first capacity, controlling storage of the first information in association with the second information; replacing means for replacing the first information attached to the electronic mail with the second information generated by the generating means; and first output controlling means for controlling output of the electronic mail after the first information has been replaced with the second information by the replacing means.

Preferably, the storage controlling means may control storage of the first information for each of subscribing users.

Preferably, the user may be a sender of the electronic mail.

Preferably, the user may be a receiver of the electronic mail.

Preferably, the information processing apparatus may further include recording controlling means for controlling recording of the number of times the first information has been stored by the storage controlling means for each of the subscribing users.

Preferably, the information processing apparatus may further include computing means for computing charges for any one of the subscribing users based on the number of times of which the recording has been controlled by the recording controlling means.

Preferably, the information processing apparatus may further include second judging means for, if the first input controlling means controls input of new electronic mail together with another first information, judging whether or not a plurality of pieces of the first information destined for any one of the subscribing users have a total storage capacity larger than a second capacity; second output controlling means for, if the second judging means judges that the plurality of pieces of the first information have a total storage capacity larger than the second capacity, controlling output of a query signal asking whether or not the first information attached to the new electronic mail is to be stored; and second input controlling means for controlling input of a storage designation signal designating storage of the first information; wherein the storage controlling means controls storage of the first information if, within a predetermined time period after the second output controlling means has controlled output of the query signal, the second input controlling means controls input of the storage designation signal designating storage of the first information.

Preferably, the information processing apparatus may further include computing means for computing charges for the subscribing users; wherein the computing means computes charges based on the second capacity and, if the second input controlling means controls input of the storage designation signal designating storage of the first information, computes additional charges.

Preferably, the second information may be authentication key information.

Preferably, the information processing apparatus may further include second input controlling means for controlling input of the authentication key information; second judging means for judging whether or not the authentication key information is valid after the input of the information has been controlled by the second input controlling means; and second output controlling means for, if the second judging means judges the authentication key information to be valid, controlling output, in increments of a data capacity equal to or less than a predetermined capacity, of the first information controlled in storage by the storage controlling means.

Preferably, the second information may be made up of address information and authentication information needed to reference the first information.

According to a second aspect of the present invention, there is provided an information processing method including the steps of controlling input of electronic mail; judging whether or not first information attached to the electronic mail has a capacity larger than a first capacity; generating second information corresponding to the first information; controlling, if the first information attached to the electronic mail is judged to have a capacity larger than the first capacity in the judging step, storage of the first information in association with the second information; replacing the first information attached to the electronic mail with the second information generated in the generating step; and controlling output of the electronic mail after the first information has been replaced with the second information in the replacing step.

According to a third aspect of the present invention, there is provided a program storage medium for storing a program including the steps of controlling input of electronic mail; judging whether or not first information attached to the electronic mail has a capacity larger than a first capacity; generating second information corresponding to the first information; controlling, if the first information attached to the electronic mail is judged to have a capacity larger than the first capacity in the judging step, storage of the first information in association with the second information; replacing the first information attached to the electronic mail with the second information generated in the generating step; and controlling output of the electronic mail after the first information has been replaced with the second information in the replacing step.

The information processing apparatus, information processing method and program storage medium according to the first to third aspect of the present invention respectively permit the following operations: electronic mail is input; a check is made to see whether or not first information attached to the electronic mail has a capacity larger than a first capacity; second information corresponding to the first information is generated; if the first information attached to the electronic mail is judged to have a capacity larger than the first capacity, then the first information is stored in association with the second information; the first information attached to the electronic mail is replaced with the generated second information; and the electronic mail is output after the first information has been replaced with the second information. As a result, when electronic mail accompanied by a large-sized attached file is sent to PDAs, portable telephones or similar limited-capacity portable data terminals, the inventive provisions let the mail alone be forwarded while retaining the attached file so that the file may later be transmitted a small capacity at a time or be browsed depending on the receiving party's need without compromising data security.

According to a fourth aspect of the present invention, there is provided another information processing apparatus including reading controlling means for controlling reading, from another information processing apparatus, of the number of times first information attached to the electronic mail has been controlled in storage regarding each of subscribing users; and computing means for computing charges for the subscribing users in accordance with the number of times of which the reading has been controlled by the reading controlling means.

According to a fifth aspect of the present invention, there is provided another information processing method including the steps of controlling reading, from another information processing apparatus, of the number of times first information attached to the electronic mail has been controlled in storage for each of subscribing users; and computing charges for the subscribing users in accordance with the number of times of which the reading has been controlled by the reading controlling step.

According to a sixth aspect of the present invention, there is provided another program storage medium for storing a program including the steps of controlling reading, from another information processing apparatus, of the number of times first information attached to the electronic mail has been controlled in storage for each of subscribing users; and computing charges for the subscribing users in accordance with the number of times of which the reading has been controlled by the reading controlling step.

The information processing apparatus, information processing method and program storage medium according the fourth to sixth aspect of the present invention respectively provide the following operations: the number of times first information attached to electronic mail has been stored for each of subscribing users is read from a second information processing apparatus; and charges for the subscribing users are computed in accordance with the number of times thus read. With the inventive provisions, each user subscribing to the attached file storage service is charged for the exact number of times the attached file has been stored.

According to a seventh aspect of the present invention, there is another information processing apparatus including reading controlling means for controlling reading, from another information processing apparatus, a signal indicating whether or not a plurality of pieces of first information attached to a plurality of pieces of the electronic mail for any one of subscribing users have amounted in storage to a capacity larger than a predetermined capacity agreed on with the subscribing user in question; and computing means for computing charges for the subscribing users; wherein the computing means computes charges based on the predetermined capacity, and computes additional charges in accordance with the signal read by the reading controlling means According to an eighth aspect of the present invention, there is provide another information processing method including the steps of controlling reading, from another information processing apparatus, a signal indicating whether or not a plurality of pieces of first information attached to a plurality of pieces of the electronic mail for any one of subscribing users have amounted in storage to a capacity equal to or larger than a predetermined capacity agreed on with the subscribing user in question; and computing charges for the subscribing users; wherein the computing step computes charges based on the predetermined capacity, and computes additional charges in accordance with the signal read in the reading controlling step.

According to a ninth aspect of the present invention, there is provided another program storage medium for storing a program including the steps of reading, from another information processing apparatus, a signal indicating whether or not a plurality of pieces of first information attached to a plurality of pieces of the electronic mail for any one of subscribing users have amounted in storage to a capacity equal to or larger than a predetermined capacity agreed on with the subscribing user in question; and computing charges for the subscribing users; wherein the computing step computes charges based on the predetermined capacity, and computes additional charges in accordance with the signal read in the reading controlling step. With the inventive provisions, each user subscribing to the attached file storage service is charged for the exact amount of attached files stored.

The information processing apparatus, information processing method and program storage medium according to the seventh to ninth aspect of the present invention respectively afford the following operations: from another information processing apparatus is read a signal indicating whether or not a plurality of pieces of first information attached to a plurality of pieces of electronic mail for any one of subscribing users have amounted in storage to a capacity equal to or larger than a predetermined capacity agreed on with the subscribing user in question; charges for the subscribing users are computed based on the predetermined capacity; and additional charges are computed in accordance with the signal thus read. With the inventive provisions, each user subscribing to the attached file storage service is charged for the exact amount of attached files stored.

According to a tenth aspect of the present invention there is provided another information processing apparatus including reception controlling means for controlling reception of electronic mail; and acquiring means for acquiring second information from the electronic mail controlled in reception by the reception controlling means, the second information being needed for access to first information.

Preferably, the information processing apparatus may further include output controlling means for controlling output of authentication key information to a second information processing apparatus which controls storage of the first information, the authentication key information being included in the second information acquired by the acquiring means.

Preferably, the information processing apparatus may further include accessing means for accessing web contents over a network in accordance with address information included in the second information acquired by the acquiring means; and output controlling means for controlling output of authentication information to a second information processing apparatus which manages the web contents, the authentication information being included in the second information acquired by the acquiring means.

According to an eleventh aspect of the present information, there is provided another information processing method including the steps of controlling reception of electronic mail; and acquiring second information from the electronic mail controlled in reception by the reception controlling step, the second information being needed for access to first information.

According to a twelfth aspect of the present invention, there is provided another program storage medium for storing a program including the steps of controlling reception of electronic mail; and acquiring second information from the electronic mail controlled in reception by the reception controlling step, the second information being needed for access to first information.

The information processing apparatus, information processing method and program storage medium according to the tenth to twelfth aspect of the present invention respectively permit reception of electronic mail, and allow second information to be acquired from the received electronic mail, the second information being needed for access to first information. As a result, when electronic mail accompanied by a large-sized attached file is sent to PDAs, portable telephones or similar limited-capacity portable data terminals, the inventive provisions let the mail be received by the terminal together with information which replaces the attached file and which permits subsequent access to that file. This prevents the terminal from rejecting the electronic mail due to a memory overflow; the attached file may be received a small capacity at a time or be browsed as needed without compromising data security.

According to a thirteenth aspect of the present invention, there is provided an information management system including a first information processing apparatus for controlling transmission and reception of electronic mail; a second information processing apparatus connected to the first information processing apparatus for controlling the transmission and reception of the electronic mail; and a third information processing apparatus for transmitting and receiving the electronic mail; wherein the first information processing apparatus includes input controlling means for controlling input of the electronic mail; judging means for judging whether or not first information attached to the electronic mail has a capacity larger than a first capacity; generating means for generating second information corresponding to the first information; storage controlling means for, if the judging means judges that the first information attached to the electronic mail has a capacity larger than the first capacity, controlling storage of the first information in association with the second information and for each of subscribing users; replacing means for replacing the first information attached to the electronic mail with the second information generated by the generating means; and output controlling means for controlling output of the electronic mail after the first information has been replaced with the second information by the replacing means; wherein the second information processing apparatus includes reading controlling means for controlling reading, from the first information processing apparatus, of charge information about the first information controlled in storage by the storage controlling means; and computing means for computing charges for the subscribing users based on the charge information controlled in reading by the reading controlling means; and wherein the third information processing apparatus includes reception controlling means for controlling reception of the electronic mail; and acquiring means for acquiring the second information from the electronic mail controlled in reception by the reception controlling means, the second information being needed for access to the first information.

This information management system includes a first information processing apparatus for controlling transmission and reception of electronic mail; a second information processing apparatus connected to the first information processing apparatus for controlling the transmission and reception of the electronic mail; and a third information processing apparatus for transmitting and receiving the electronic mail. The first information processing apparatus permits the following operations: the electronic mail is input; a check is made to see whether or not first information attached to the electronic mail has a capacity larger than a first capacity; second information corresponding to the first information is generated; if the first information attached to the electronic mail is judged to have a capacity larger than the first capacity, then the first information is stored in association with the second information and for each of subscribing users; the first information attached to the electronic mail is replaced with the second information thus generated; and the electronic mail is output after the first information has been replaced with the second information. The second information processing apparatus reads charge information about the stored first information from the first information processing apparatus, and computes charges for the subscribing users based on the charge information thus read. The third information processing apparatus receives the electronic mail and acquires the second information from the received electronic mail, the second information being needed for access to the first information. As a result, this inventive system provides the service allowing PDAs, portable telephones or similar limited-capacity portable data terminals to receive electronic mail accompanied by large-sized attached files without compromising data security, and charges users of the terminals for the service rendered.

According to a fourteenth aspect of the present invention, there is provided another information management system including a first information processing apparatus for controlling transmission and reception of electronic mail; and a second information processing apparatus for transmitting and receiving the electronic mail; wherein the first information processing apparatus includes input controlling means for controlling input of the electronic mail; judging means for judging whether or not first information attached to the electronic mail has a capacity larger than a first capacity; generating means for generating second information corresponding to the first information; storage controlling means for, if the judging means judges that the first information attached to the electronic mail has a capacity larger than the first capacity, controlling storage of the first information in association with the second information and for each of subscribing users; replacing means for replacing the first information attached to the electronic mail with the second information generated by the generating means; output controlling means for controlling output of the electronic mail after the first information has been replaced with the second information by the replacing means; and computing means for computing charges for each of the subscribing users regarding the first information controlled in storage by the storage controlling means; and wherein the second information processing apparatus includes reception controlling means for controlling reception of the electronic mail; and acquiring means for acquiring the second information from the electronic mail controlled in reception by the reception controlling means, the second information being needed for access to the first information.

This information management system includes a first information processing apparatus for controlling transmission and reception of electronic mail, and a second information processing apparatus for transmitting and receiving the electronic mail. The first information processing apparatus affords the following operations: the electronic mail is input; a check is made to see whether or not first information attached to the electronic mail has a capacity larger than a first capacity; second information corresponding to the first information is generated; if the first information attached to the electronic mail is judged to have a capacity larger than the first capacity, then the first information is stored in association with the second information and for each of subscribing users; the first information attached to the electronic mail is replaced with the generated second information; the electronic mail is output after the first information has been replaced with the second information; and charges are computed for each of the subscribing users regarding the stored first information. The second information processing apparatus receives the electronic mail and acquires the second information from the received electronic mail, the second information being needed for access to the first information. As a result, this inventive system also provides the service allowing PDAs, portable telephones or similar limited-capacity portable data terminals to receive electronic mail accompanied by large-sized attached files without compromising data security, and charges users of the terminals for the service rendered.

BRIEF DESCRIPTION OF THE DRAWINGS

FIG. 4 is a block diagram showing an internal structure of the camera-equipped digital portable telephone;

FIG. 5 is a block diagram indicating a typical mail server structure;

FIGS. 6A and 6B are tabular views explaining typical file ID tables in a storage device;

DETAILED DESCRIPTION OF THE PREFERRED EMBODIMENT

Hereinafter, preferred embodiments of the present invention will be described with reference to the accompanying drawings.

Figure 1:
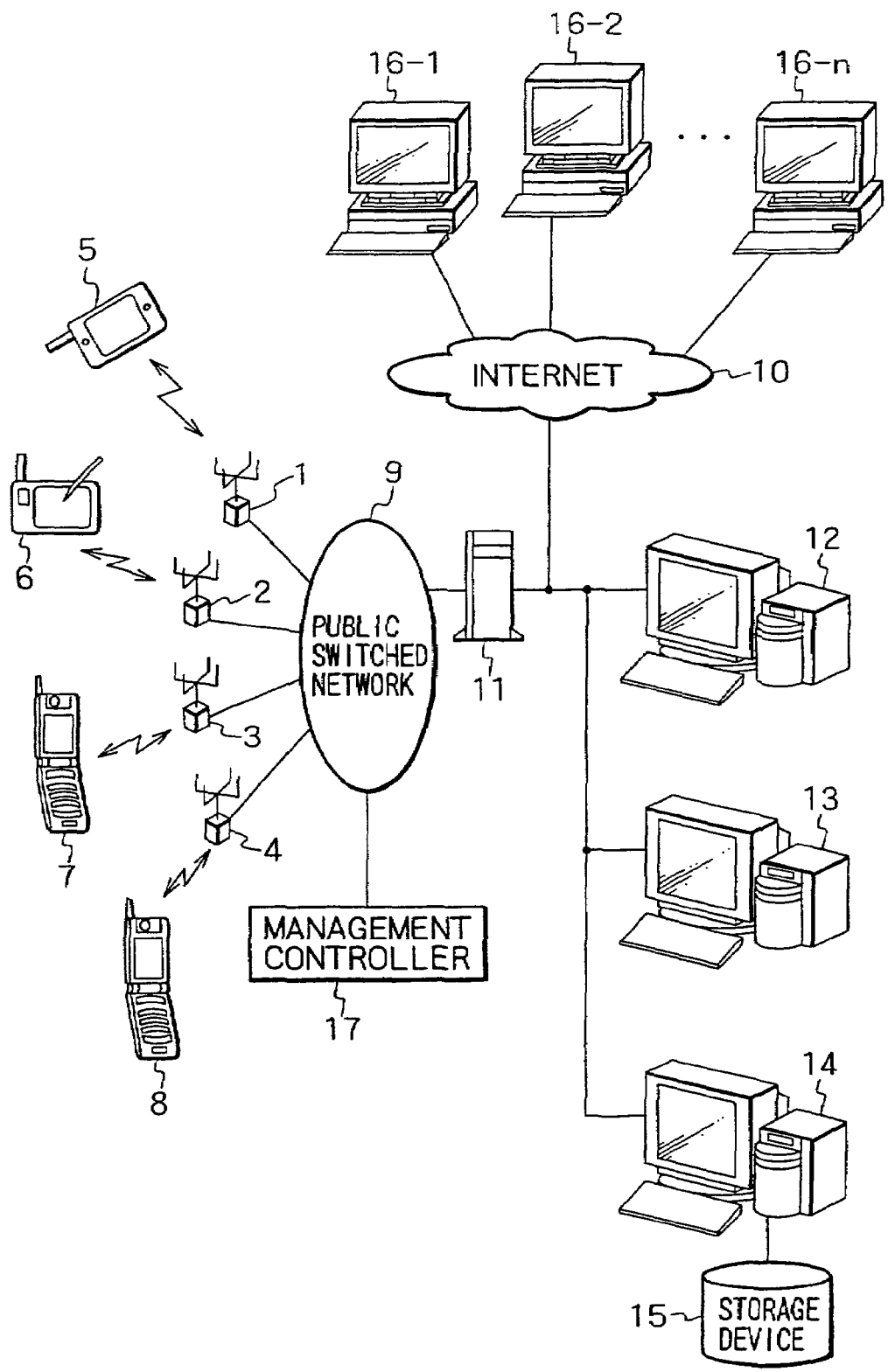
FIG. 1 is a schematic view showing an overall configuration of a network system to which is applied an attached file management system according to this invention.

FIG. 1 is a schematic view showing an overall configuration of a network system to which is applied an attached file management system according to this invention.

Base stations 1 through 4 are set up as fixed wireless stations covering cells that divide a communication service area into predetermined regions. Each of the base stations 1 through 4 is connected wirelessly to portable data terminals 5 and 6 as well as to camera-equipped digital portable telephones 7 and 8 operating as mobile wireless stations. Such wireless connections are established on the basis of a method known as W-CDMA (Wideband—Code Division Multiple Access). The method involves utilizing a 2-GHz frequency band for high-speed data transmission at data transfer rates of up to 2 Mbps.

The portable data terminals 5 and 6 as well as the camera-equipped digital portable telephones 7 and 8 are capable of communicating large quantities of data at high speed based on the W-CDMA method. As such, these terminals permit not only voice calls but also such data communications as sending and receiving of electronic mail, browsing of websites furnished in simple format, and exchanges of image data.

The base stations 1 through 4 are connected wirelessly to a public switched network 9. The public switched network 9 is in turn connected with numerous wired subscriber terminals, computer networks, and local area networks.

The public switched network 9 is also linked to access servers 11 of Internet service providers. The access server 11 of each Internet service provider is connected with a content server 12, a charge server 13, and a mail server 14 which in turn is linked to a storage device 15.

Upon request, the content server 12 provides any of the wired subscriber terminals, portable data terminals 5 and 6, and camera-equipped digital portable telephones 7 and 8 with such contents as simplified websites illustratively in a simple HTML (Hyper Text Markup Language) file format.

The charge server 13 performs charge processing about services offered by the Internet service provider to its subscribing users. Based on an agreement with each user, the charge server 13 illustratively computes charges either for a time period during which the terminal of the user in question has been connected to the provider's facilities or for quantities of data transferred by the user's terminal via the service provider. As will be described later by referring to FIGS. 7 through 10, the charge server 13 also computes additional charges for specific services enjoyed by users such as storage of files attached to electronic mail.

The mail server 14 provides a number of functions: a sent mail server function for forwarding electronic mail sent by subscribing users of the Internet service provider to the destinations specified by mail addresses; a received mail server function for selectively transferring electronic mail placed in the mail server 14 to the users' mail storage area (made up of so-called mailboxes); a mail repeating function for repeating electronic mail between different distribution systems; and a mail transfer function which, upon users' request, transfers mail from their mailboxes to their terminal equipment (e.g., the portable data terminal 5 through the camera-equipped digital portable telephone 8 in FIG. 1)

The mail server 14 need not be a single device and may comprise multiple devices such as the following: a device for receiving electronic mail (i.e., received mail server); a device for replacing files attached to electronic mail with key information (or with a URL and a password) using steps to be discussed later by referring to FIGS. 7 through 10; a device that manages the storage device 15 so as to store the attached files of electronic mail into the storage device 15 or to retrieve the files therefrom for transmission to their destinations; and a device for sending electronic mail (i.e., sent mail server). These devices may be physically separate but will provide integral functions as long as they communicate with one another over a network.

The content server 12, charge server 13 and mail server 14 need not be separate entities. Illustratively, a single server may be used to carry out the processes that should otherwise be dealt with separately by the content server 12 through the mail server 14. As another alternative, the processes executed by the charge server 13 and mail server 14 may be performed by a single server.

The mail server 14 is connected to the storage device 15. The storage device 15 has a number of storage areas: a temporary storage area in which to accommodate electronic mail if the mail sent by any user to destinations specified by mail addresses needs to be retained temporarily; a mail storage area (composed of the mailboxes) in which electronic mail placed in the mail server 14 is transferred selectively to individual users; a repeated mail storage area in which to store electronic mail repeated between different distribution systems if the mail needs to be retained temporarily; a user-wise attached file storage area in which to place attached files with regard to the individual users under contract with the service provider for the attached file service; another temporary storage area besides the user-wise attached file storage area and in which attached files are stored temporarily as needed; and file ID tables, to be described later with reference to FIGS. 6A and 6B.

The Internet 10 is connected to numerous WWW (World Wide Web) servers 16-1 through 16-n which are accessed by any of the wired subscriber terminals, portable data terminals 5 and 6, and camera-equipped digital portable telephones 7 and 8 in accordance with TCP/IP (Transmission Control Protocol/Internet Protocol).

The portable data terminals 5 and 6 as well as the camera-equipped digital portable telephones 7 and 8 communicate with the base stations 1 through 4, not shown, in keeping with a simple transport protocol at 2 Mbps. The base stations 1 through 4 communicate with the WWW servers 16-1 through 16-n over the Internet 10 based on the TCP/IP protocol.

A management controller 17 is connected through the public switched network 9 to the wired subscriber terminals, portable data terminals 5 and 6, and camera-equipped digital portable telephones 7 and 8. The controller 17 performs authentication and charge processing about these terminals connected thereto.

External features of the camera-equipped digital portable telephone 7 will now be described by referring to FIGS. 2 and 3. The camera-equipped digital portable telephone 8 is basically the same in structure as the portable telephone 7 and thus will not be described further about its external features.

Figure 2:
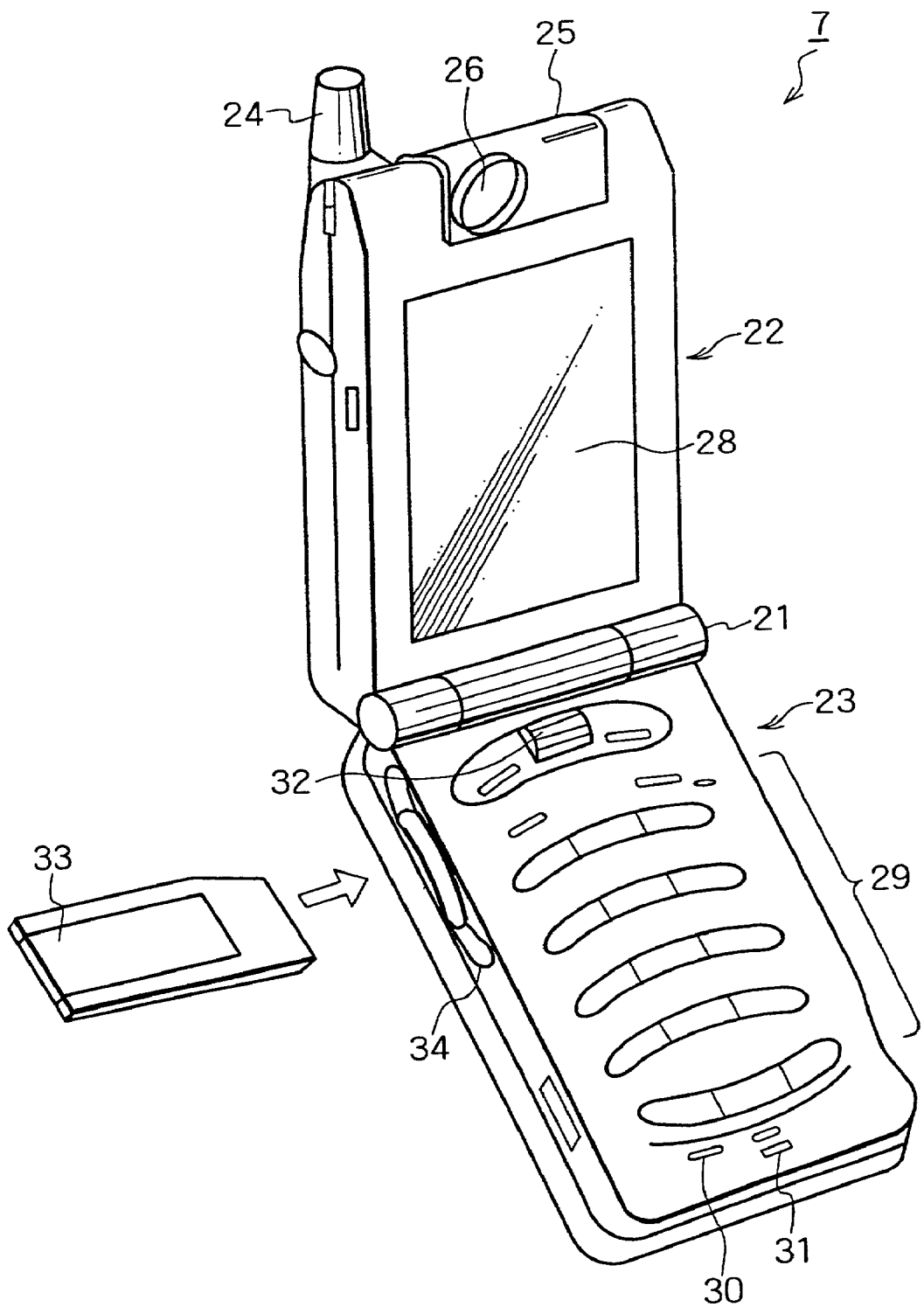
FIG. 2 is a schematic perspective view showing external features of a camera-equipped digital portable telephone.

As shown in FIG. 2, the camera-equipped digital portable telephone 7 is primarily made up of a display unit 22 and a body 23 connected by a hinge 21 interposed therebetween. The two parts fold into one piece around the hinge 21.

In the top left corner of the display unit 22 is a transmitting-receiving antenna 24 furnished in a collapsible manner. Communications are exchanged wirelessly with, say, the base station 3 via the antenna 24.

In the top middle part of the display unit 22 is a camera unit 25 furnished rotatably for a range of about 180 degrees. A CCD camera 26 in the camera unit 25 serves to take pictures of desired objects.

Figure 3:
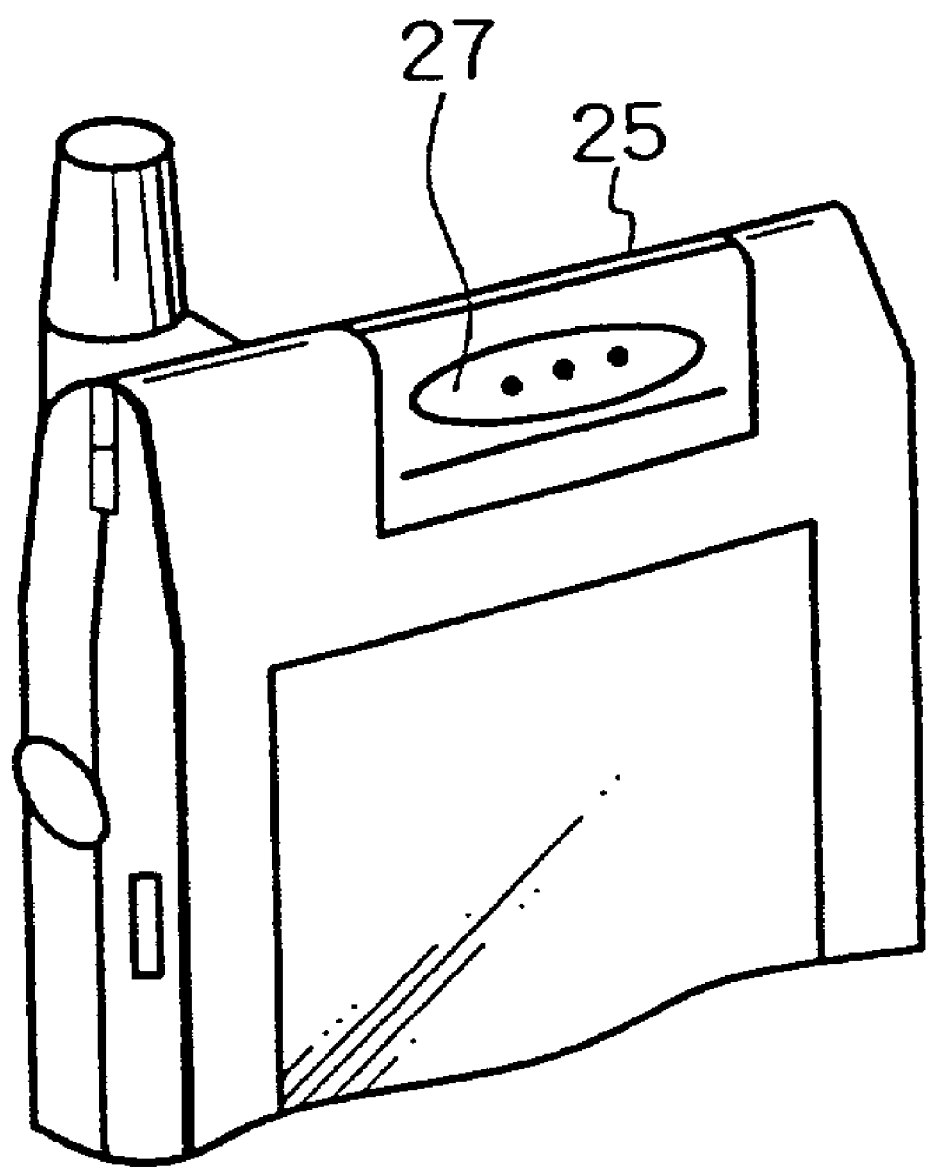
FIG. 3 is a schematic perspective view of the portable telephone with its camera unit rotated on its display unit.

When the camera unit 25 is rotated by about 180 degrees by a user, a speaker 27 swings into front position from its rear position on the display unit 22, as shown in FIG. 3. This setting puts the telephone into ordinary voice call status.

A liquid crystal display 28 is furnished in the front F part of the display unit 22. The LCD 28 displays reception status, the remaining battery level, registered parties' names and telephone numbers in directory lists, a call history, contents of electronic mail, contents of websites in simple format, and pictures taken by the CCD camera 26 of the camera unit 25.

On its surface, the body 23 includes such operation keys 29 as numeric keys "0" through "9," an off-hook key, a redial key, an on-hook/power key, a clear key, and an e-mail key. The user may issue various commands by manipulating the operation keys 29.

Under the operation keys 29, the body 23 has a memo key 30 and a microphone 31. The memo key 29 is used to record the other party's voice during a phone call. The microphone 31 picks up the user's voice during the call.

Above the operation keys 29, the body 23 has a rotatable jog dial 32 furnished in a manner slightly projecting from the body surface. Manually rotating the jog dial 32 causes a directory list or e-mail contents to be scrolled, pages of simple-format websites to be turned, and pictures to be forwarded on the liquid crystal display 28.

Illustratively, the user may rotate the jog dial 32 on the camera-equipped digital portable telephone 7 to select a desired telephone number from a plurality of telephone numbers in a directory list appearing on the LCD 28. Pushing inward the jog dial 32 on the body 23 finalizes selection of the indicated telephone number so that the number in question is automatically called.

A battery pack, not shown, is attached to the back of the body 23. When a non-hook state is reached or when the power key is operated, the battery pack powers the circuits involved and renders the telephone operable.

In the top left edge portion of the body 23 is a memory stick slot 34 that accommodates a removable Memory Stick (trademark) 33. Pushing down the memo key 30 allows the Memory Stick 33 to record the other party's voice during a telephone call, store e-mail or simple-format website contents, or record a picture taken by the CCD camera 26 depending on the user's operation.

The Memory Stick 33 is a flash memory card developed by this applicant, Sony Corporation. The Memory Stick 33 is made up of flash memory elements constituting a nonvolatile memory EEPROM (Electrically Erasable and Programmable Read Only Memory) housed in a small, thin plastic case measuring 25 mm wide, 50 mm long and 2.8 mm thick. A 10-pin plug allows various kinds of data such as pictures, voice and sounds to be written to and read from the inserted Memory Stick.

The Memory Stick 33 adopts a proprietary serial protocol that secures compatibility with host devices even when specifications of built-in flash memories change as they grow in capacity. The protocol provides a maximum write speed of 1.5 MB/S and a maximum read speed of 2.45 MB/S. Equipped with an anti-accidental erasure switch, the memory ensures a high degree of reliability Designed to accommodate the Memory Stick 33, the camera-equipped digital portable telephone 7 may share data with other electronic devices by way of the inserted removable memory.

FIG. 4 is a block diagram showing an internal structure of the camera-equipped digital portable telephone 7. The camera-equipped digital portable telephone 8 is basically the same in structure as the portable telephone 7 and thus will not be described further about its internal structure.

As shown in FIG. 4, the camera-equipped digital portable telephone 7 includes a main controller 41 designed to provide overall control on the components of the display unit 22 and body 23. The main controller 41 is connected via a main bus 51 with a power circuit 42, an operation input controller 43, an image encoder 44, a camera interface 45, an LCD (liquid crystal display) controller 46, an image decoder 47, a division multiplexer 48, a modem 49 and a voice codec 50. Furthermore, the image encoder 44, the image decoder 47, the division multiplexer 48, the modem 49, the voice codec 50 and a recorder-player circuit 53 are interconnected by way of a synchronous bus 52.

When the user goes on-hook or turns on the power key, the power circuit 42 causes the battery pack to supply power to the components involved. This places the camera-equipped digital portable telephone 7 into operative status.

In a voice call mode, a voice signal picked up by the microphone is converted by the voice codec 50 into digital audio data under control of the main controller 41 constituted by a CPU (central processing unit), a ROM (read only memory) and a RAM (random access memory). The digital audio data are subjected to spread-spectrum encoding by the modem 49 before undergoing digital-analog conversion and frequency conversion by the transmitter-receiver circuit 54. After the conversion, the data are transmitted from the antenna 24.

Also in the voice call mode, a received signal captured by the antenna 24 is amplified and subjected to frequency conversion and analog-digital conversion. The signal thus converted is subjected to spread-spectrum decoding by the modem 49. The signal thus processed is converted to an analog voice signal by the voice codec 50 before being output by the speaker 27.

Electronic mail is transmitted in a data communication mode as follows: text data of the mail are first entered by manipulating the operation keys 29 and jog dial 32. The text data are fed to the main controller 41 via the operation input controller 43. The main controller 41 subjects the text data to spread-spectrum encoding by the modem 49 prior to digital-analog conversion and frequency conversion by the transmitter-receiver circuit 54. The data thus converted are transmitted to the base station 3 (see FIG. 1) from the antenna 24.

Electronic mail is received in the data communication mode as follows: a received signal from the base station 3 picked up by the antenna 24 is subjected to spread-spectrum decoding by the modem 49 whereby the original text data are restored. The text data are sent through the LCD controller 46 to the liquid crystal display 28 for display as a mail text. After this, depending on the user's operation, the received mail may be written to the Memory Stick by way of the recorder-player circuit 53.

Image data are transmitted in a data communication mode as follows: image data picked up by the CCD camera 26 are supplied to the image encoder 44 via the camera interface 45. The image encoder 44 converts the image data from the CCD camera 26 into coded image data through suitable compression coding such as that of MPEG (Moving Picture Experts Group) 2 or MPEG4. The image data thus coded are output to the division multiplexer 48.

Where image data picked up by the CCD camera 26 are not transmitted, they may be directly displayed on the liquid crystal display 28 via the camera interface 45 and LCD controller 46.

Any voice picked up by the microphone 31 during picture-taking by the CCD camera 26 is sent as digital audio data to the division multiplexer 48 via the voice codec 50. The division multiplexer 58 multiplexes the coded image data from the image encoder 44 and the audio data from the voice codec 50 in accordance with a specific method. The resulting multiplexed data are subjected to spread-spectrum coding by the modem 49 before undergoing digital-analog conversion and frequency conversion by the transmitter-receiver circuit 54. The data thus converted are transmitted from the antenna 24.

Also in the data communication mode, data representing a moving picture file linked illustratively to a simple-format website are received as follows: a received signal from the base station 3 picked up by the antenna 24 is subjected to spread-spectrum decoding by the modem 49. The decoding process yields multiplexed data that are sent to the division multiplexer 48. The division multiplexer 48 divides the input multiplexed data into coded image data and audio data. Over the synchronous bus 52, the coded image data are fed to the image decoder 47 while the audio data are sent to the voice codec 50.

The image decoder 47 decodes the coded image data in accordance with the appropriate coding method such as that of MPEG2 or MPEG4, thus generating moving picture data to be reproduced. The moving picture data are supplied through the LCD controller 46 to the liquid crystal display 28 for playback. In this manner, the moving picture data contained in the moving picture file derived from the simple-format website are displayed on the LCD 28.

While the image data are being processed, the voice codec 50 converts the audio data into an analog audio signal that is sent to the speaker 27 for output. In this manner, the audio data held in the moving picture file acquired from the simple-format website are reproduced from the speaker 27.

In this case, as during the reception of electronic mail, the received data linked to the simple-format website may also be written via the recorder-player circuit 53 to the inserted Memory Stick 33 depending on the user's operation.

FIG. 5 is a block diagram showing a typical structure of the mail server 14. The content server 12 and the charge server 13 are basically the same in structure as the mail server 14 and thus will not be described further about their structure.

A CPU (central processing unit) 61 of the mail server 14 performs various processes in response to signals representing diverse commands input by the user using an input unit 64 and through an I/O interface 62 and an internal bus 63, as well as in reply to control signals entered via a network interface 65. A ROM (read only memory) 66 stores basically fixed data constituting those programs and calculation parameters which are used by the CPU 61. A RAM (random access memory) 67 accommodates programs used by the CPU 61 executing processes as well as parameters that are varied as needed during CPU execution. The CPU 61, ROM 66, and RAM 67 are interconnected each other through the internal bus 63.

The internal bus 63 is also connected to the I/O interface 62. The input unit 62 consists of, for example, a keyboard and a mouse and is operated when various commands are inputted to the CPU 61. A display unit 68 is composed of, for example, a CRT (cathode ray tube) that displays diverse kinds of information in text or as images. A hard disk drive (HDD) 69 drives hard disks, writing and reading programs and data to and from the disks for execution by the CPU 61. A drive 70 accommodates a storage medium such as a magnetic disk 71, an optical disk 72, a magneto-optical disk 73, or a semiconductor memory 74 for data exchange purposes as required.

The network interface 65 is connected to the Internet to exchange data with the WWW servers 16-1 through 16-n deployed on the Internet. The network interface 65 is also connected via a suitable interface cable to the storage device 15, storing received electronic mail and files attached to the mail into specific regions and updating data in file ID tables within the storage device, as will be described later by referring to FIGS. 6A and 6B. The network interface 65 is further connected via the access server 11 to the public switched network 9. Through the base stations 1 through 4 linked to the public switched network 9, the network interface 65 exchanges data with the portable data terminals 5 and 6 as well as with the camera-equipped digital portable telephones 7 and 8.

The components ranging from the input unit 64 to the network interface 65 are connected to the CPU 61 via the I/O interface 62 and internal bus 63.

FIGS. 6A and 6B are tabular views explaining typical file ID tables stored in the storage device 15. By means of one of the processes to be described later by referring to FIGS. 7 through 10, an attached file of electronic mail is stored into the storage device 15 and the corresponding data in a file ID table in the storage are updated accordingly. Attached files are each associated with either key information or a URL and a password before being written to the user-wise attached file storage area that is allocated to each subscribing user.

In the example of FIG. 6A, key information is generated in a manner unique to each attached file, and the key information is transmitted in place of the attached file. It is impossible to predict or surmise the key information from any other information; only the legitimate receiving party of the mail may acquire the key information. The receiving party issues a file transfer request containing the key through the party's terminal equipment for retrieval of the attached file from the storage device 15, as in step S63 of FIG. 11 to be described later. The key information serves to authenticate the legitimate receiving party.

For example, if the mail received by the receiving party is accompanied by key information "XXX012," the receiving party sends the key information to the mail server 14. In turn, the CPU 61 of the mail server 14 searches through file ID tables for the received key information. If the matching key information is found, the CPU 61 retrieves from the storage device 15 an attached file named "ABC001.JPG" stored in association with the key information in question, and sends the file to the receiving party. The attached file is transmitted in small increments to allow for reception by terminal equipment such as the camera-equipped digital portable telephone 7 incapable of receiving a large quantity of data at once.

In the example of FIG. 6B, each attached file is assigned a URL and a password which are transmitted in place of the file. The receiving party of the mail gains access to a website content designated by the received URL, and enters the password. When the password is authenticated, the receiving party can read the attached file corresponding to the password.

For example, if the mail received by the receiving party is accompanied by a URL "WWW.SXXX.YYY.html" and a password "XXX013," the receiving party first gains access to a website content designated by that URL and enters the password "XXX013" into, for example, a password entry text box. On judging the input password to be correct, the CPU 61 of the content server 12 retrieves an attached file named "ABC001.JPG" from storage for display. Alternatively, the corresponding attached file may be downloaded from the applicable website content.

In FIGS. 6A and 6B, file names are each shown recorded in association with either key information or a URL and a password. Alternatively, file names may be replaced by attached file numbers each unique to the corresponding file for identification in storage, so that the attached file numbers may be recorded in a file ID table.

An attached file storage process (1) in effect upon electronic mail transmission is described below by referring to a flowchart of FIG. 7. This storage process includes handling charges for the number of times an attached file storage service has been utilized for electronic mail transmission by the mail server 14.

In step S1, the CPU 61 of the mail server 14 accepts input of electronic mail that is to be sent from this mail server (i.e., mail server 14 acting as the sent mail server) through the access server 11. In step S2, a check is made to see whether or not the input electronic mail is accompanied by an attached file having a data capacity larger than a predetermined threshold value. If in step S2 the electronic mail is not judged to have an attached file greater than the threshold value in data capacity, step S8 is reached.

If in step S2 the electronic mail is judged to have an attached file of a data capacity larger than the predetermined threshold value, the CPU 61 goes to step S3. In step S3, the CPU 61 generates key information (or a URL and a password) in association with the attached file in question. In step S4, the key information (or the URL and password) and an attached file name (or an attached file number) are output to the storage device 15 and written to a file ID table therein via the internal bus 63, I/O interface 62, and network interface 65.

In step S5, the CPU 61 replaces the attached file of the electronic mail received in step S1 with the key information (or the URL and password) generated in step S3.

In step S6, the CPU 61 identifies the transmitting party by referring to a header of the electronic mail, and increments by 1 a counter value N representing the number of times the attached file storage service has been utilized (N=N+1).

In step S7, the CPU 61 outputs the attached file following the replacing step S5 to the user-wise attached file storage area in the storage device 15 via the internal bus 63, I/O interface 62, and network interface 65. The attached file thus output is stored into the storage area.

When in step S2 the electronic mail is not judged to have an attached file of a data capacity larger than the threshold value, or when the processing of step S7 is completed, step S8 is reached. In step S8, the CPU 61 transmits the electronic mail to the destination mail server through the internal bus 63, I/O interface 62, network interface 65, access server 11, and the Internet 10. This terminates the whole storage process (1).

Figure 7:
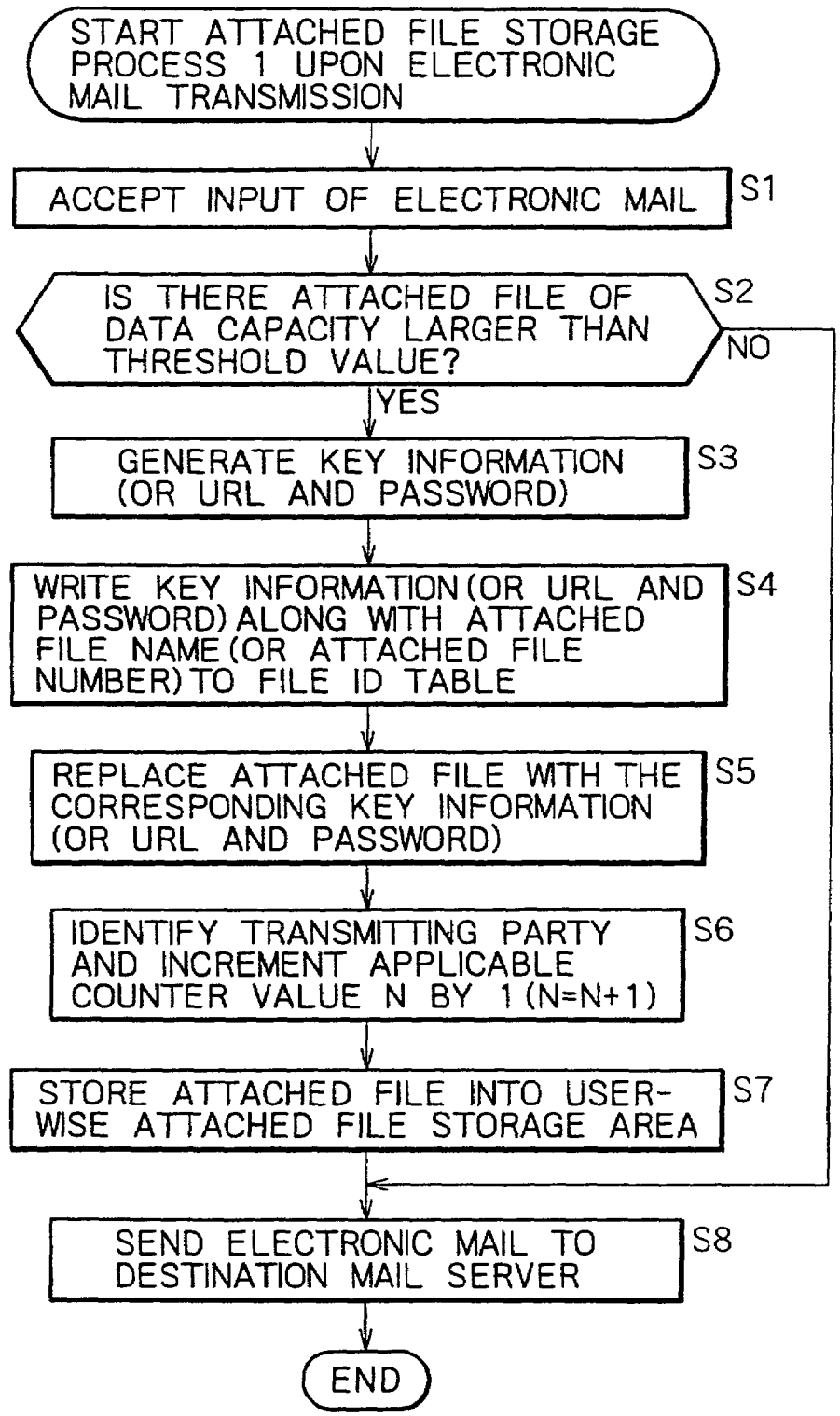
FIG. 7 is a flowchart of steps comprising an attached file storage process performed upon electronic mail transmission.

In the process of FIG. 7, if the transmitting party of electronic mail makes use of the attached file storage service, the number of times the service has been used is counted in step S6 and the transmitting party is charged for the service usage count. More specifically, the charge server 13 reads periodically (e.g., once a month) from the mail server 14 the number of times (N) the attached file storage service has been used by each subscribing user. The user is then charged for the attached file storage service based on the service use count N.

Attached files are retained in the user-wise attached file storage area of the storage device 15 for a predetermined period of time. Past the fixed storage period, the attached files are erased automatically from the user-wise attached file storage area.

In the process of FIG. 7, each subscribing user is shown charged for the number of times the user has utilized the attached file storage service. Alternatively, the data capacity of a user-wise attached file storage area for each user may be determined in advance by agreement, and each user may be charged illustratively once a month for the data capacity made available under contract with the service provider. If the predetermined data capacity of the user-wise attached file storage area is exceeded by any attached file written thereto, the user may be charged additional fees.

The attached file storage process (4) in effect upon electronic mail transmission is described below by referring to a flowchart of FIG. 8. This storage process includes handling charges for an agreed-on data capacity of a user-wise attached file storage area regarding each user during electronic mail transmission by the mail server 14.

Steps S11 and S12 are carried out to perform the same processes as those of steps S1 and S2 in FIG. 7. If in step S12 the electronic mail is not judged to have an attached file of a data capacity larger than a predetermined threshold value, step S13 is carried out to perform the same process as that of step S8 in FIG. 7. This terminates the processing.

If in step S12 the electronic mail is judged to have an attached file of a data capacity larger than the predetermined threshold value, steps S14 through S16 are carried out to perform the same processes as those of steps S3 through S5 in FIG. 7. In step S17, the same process as that of step S8 in FIG. 7 is performed.

In step S18, the CPU 61 of the mail server 14 verifies the size of the attached file replaced in step S16. In step S19, the CPU 61 judges whether or not adding the attached file to the user-wise attached file storage area causes the area to exceed a storage capacity agreed on with the transmitting party of the mail. If in step S19 the storage capacity under contract with the transmitting party is not judged to be exceeded, step S24 is reached.

If it is judged in step S19 that the storage capacity agreed on with the transmitting party is exceeded, the CPU 61 goes to step S20. In step S20, the CPU 61 outputs the attached file to a temporary storage area of the storage device 15 through the internal bus 63, I/O interface 62, and network interface 65. In step S21, the CPU 61 informs the contracting party of the attached file storage service (i.e., the transmitting party of the mail in this case) that a capacity overflow has occurred. The CPU 61 then generates a message requesting approval for paying additional charges, and transmits the message to the contracting party (i.e., terminal equipment to which the electronic mail is sent) through the internal bus 63, I/O interface 62, network interface 65, and access server 11.

In step S22, the CPU 61 judges whether or not a payment approval signal is input within a predetermined time period through the access server 11, network interface 65, I/O interface 62, and internal bus 63, the signal indicating the contracting party's approval for paying additional charges. If in step S22 the payment approval signal is judged to be received from the contracting party, step S24 is reached.

If in step S22 the payment approval signal is not judged to be received from the contracting party, the CPU 61 generates a control signal for deleting the attached file from the temporary storage area of the storage device 15. The control signal is output to the storage device 15 via the internal bus 63, I/O interface 62 and network interface 65, whereby the corresponding attached file is deleted. This terminates the processing.

If it is judged in step S19 that the storage capacity agreed on with the transmitting party is not exceeded, or if in step S22 the payment approval signal is judged received from the contracting party, step S24 is reached. In step S24, the same process as that of step S7 in FIG. 7 is carried out. This terminates the processing.

Figure 8:
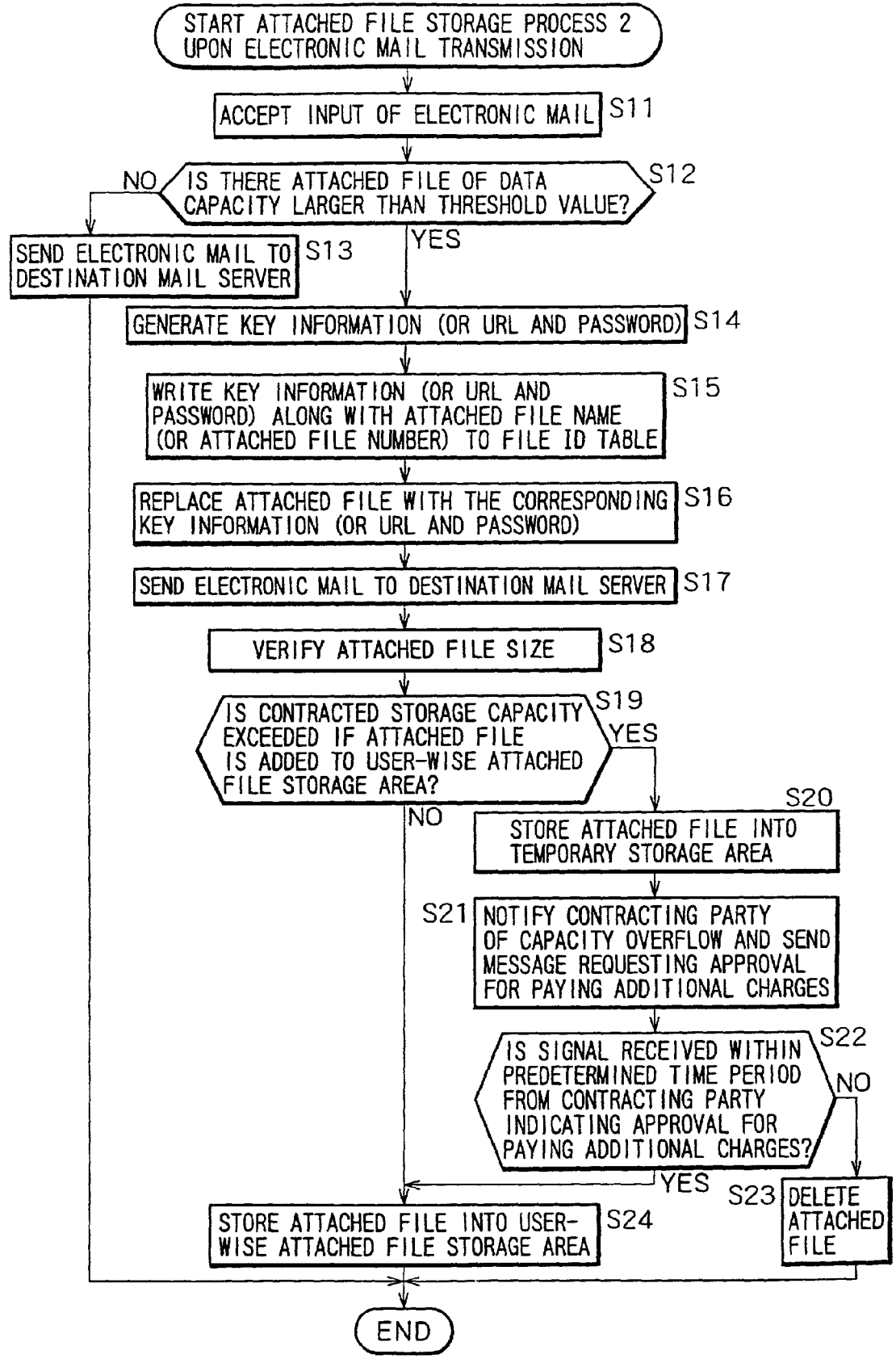
FIG. 8 is a flowchart of steps comprising another attached file storage process performed upon electronic mail transmission.

Suppose that in the processing of FIG. 8, the payment approval signal has not been given by the contracting party over a predetermined time period (e.g., one month). In that case, the charge server 13 computes charges for the user based on the agreed-on data capacity. If, on the other hand, approval is judged to be given in step S22 within the fixed time period for paying additional charges, the charge server 13 computes the charges for the user based illustratively on the capacity of the attached files in excess of the predetermined storage capacity.

It is possible to predetermine a period during which attached files are allowed to be stored in the user-wise attached file storage area of the storage device 15, so that any attached file past the storage period may be automatically deleted from the storage area. As another alternative, the transmitting party of electronic mail may give instructions to delete attached files from the user-wise attached file storage area assigned to the party.

In the processing of FIGS. 7 and 8, the transmitting party of electronic mail has been shown entering into a contract with the service provider on the attached file storage service, the transmitting party paying charges for the service as agreed on with the provider. Alternatively, the receiving party of electronic mail in place of the transmitting party may sign a contract with the service provider on the attached file storage service, the receiving party paying charges for the service rendered.

The attached file storage process (1) in effect upon electronic mail reception is described below by referring to a flowchart of FIG. 9. This storage process includes handling charges for the number of times the attached file storage service has been utilized for electronic mail reception.

In step S31, the CPU 61 of the mail server 14 receives electronic mail over the Internet 10 from the mail server of another Internet service provider. In step S32, the CPU 61 judges whether or not the received electronic mail has an attached file of a data capacity larger than a predetermined threshold value. If it is judged in step S32 that the mail has no attached file of a data capacity larger than the predetermined threshold value, step S38 is reached.

If in step S32 the mail is judged to have an attached file of a data capacity larger than the predetermined threshold value, steps S33 through S37 are carried out to perform the same processes as those of steps S3 through S7 in FIG. 7.

When in step S32 the electronic mail is not judged to have an attached file of a data capacity larger than the threshold value, or when the processing of step S37 is completed, step S38 is reached. In step S38, the CPU 61 transmits the electronic mail to a suitable mail storage area of the storage device 15 through the internal bus 63, I/O interface 62 and network interface 65. This terminates the processing.

Figure 9:
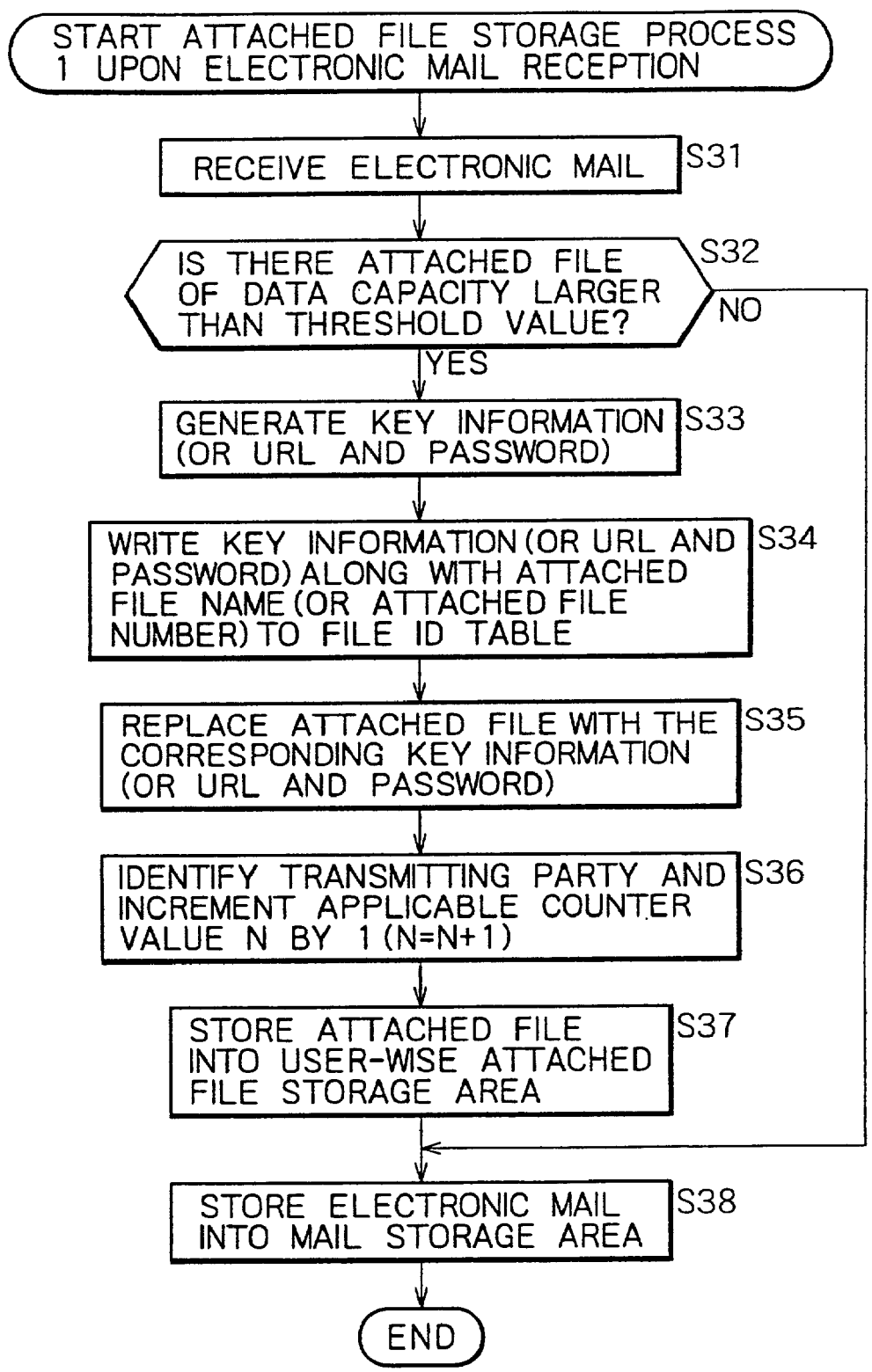
FIG. 9 is a flowchart of steps comprising an attached file storage process performed upon electronic mail reception.

In the processing with reference to FIG. 9, the receiving party is charged for the number of times the attached file storage service has been utilized. The charge server 13 computes the charges based on the number of times (N) the service in question has been used, as described with reference to FIG. 7.

As in the case of FIG. 7, a period may be predetermined during which attached files are allowed to be stored in the user-wise attached file storage area of the storage device 15, so that any attached file past the storage period may be automatically deleted from the storage area.

When using the attached file storage service for electronic mail reception, the receiving party may enter into a contract with the service provider regarding the attached file storage service for example on a monthly, per-capacity basis, as in the case of FIG. 8. If a predetermined data capacity of the receiving party's user-wise attached file storage area is exceeded by any attached file written thereto, the receiving party may be charged additional fees.

The attached file storage process (2) in effect upon electronic mail reception is described below by referring to a flowchart of FIG. 10. This storage process includes handling charges for an agreed-on data capacity of a user-wise attached file storage area for each receiving party during electronic mail reception.

Steps S41 and S42 are carried out to perform the same processes as those of steps S31 and S32 in FIG. 9. If in step S42 the electronic mail is not judged to have an attached file of a data capacity larger than a threshold value, step S43 is carried out to perform the same process as that of step S38 in FIG. 9. This terminates the processing.

If in step S42 the electronic mail is judged to have an attached file of a data capacity larger than the predetermined threshold value, steps S44 through S46 are carried out to perform the same processes as those of steps S33 through S35 in FIG. 9. In step S47, the same process as that of step S43 is performed. In steps S48 through S54, the same processes as those of steps S18 through S24 in FIG. 8 are performed. This terminates the processing.

In the processing described with reference to FIG. 10, the charge server 13 computes charges for each user in the same manner as explained above with reference to FIG. 8. That is, the charge server 13 computes charges based on whether or not the predetermined data capacity is exceeded by any attached file written to the storage area assigned to the subscribing user in question.

As in the case of FIG. 8, a period may be predetermined during which attached files are allowed to be stored in the user-wise attached file storage area of the storage device 15, so that any attached file past the storage period may be automatically deleted from the storage area. As another alternative, the transmitting party of electronic mail may give instructions to delete attached files from the user-wise attached file storage area assigned to the party.

Figure 10:
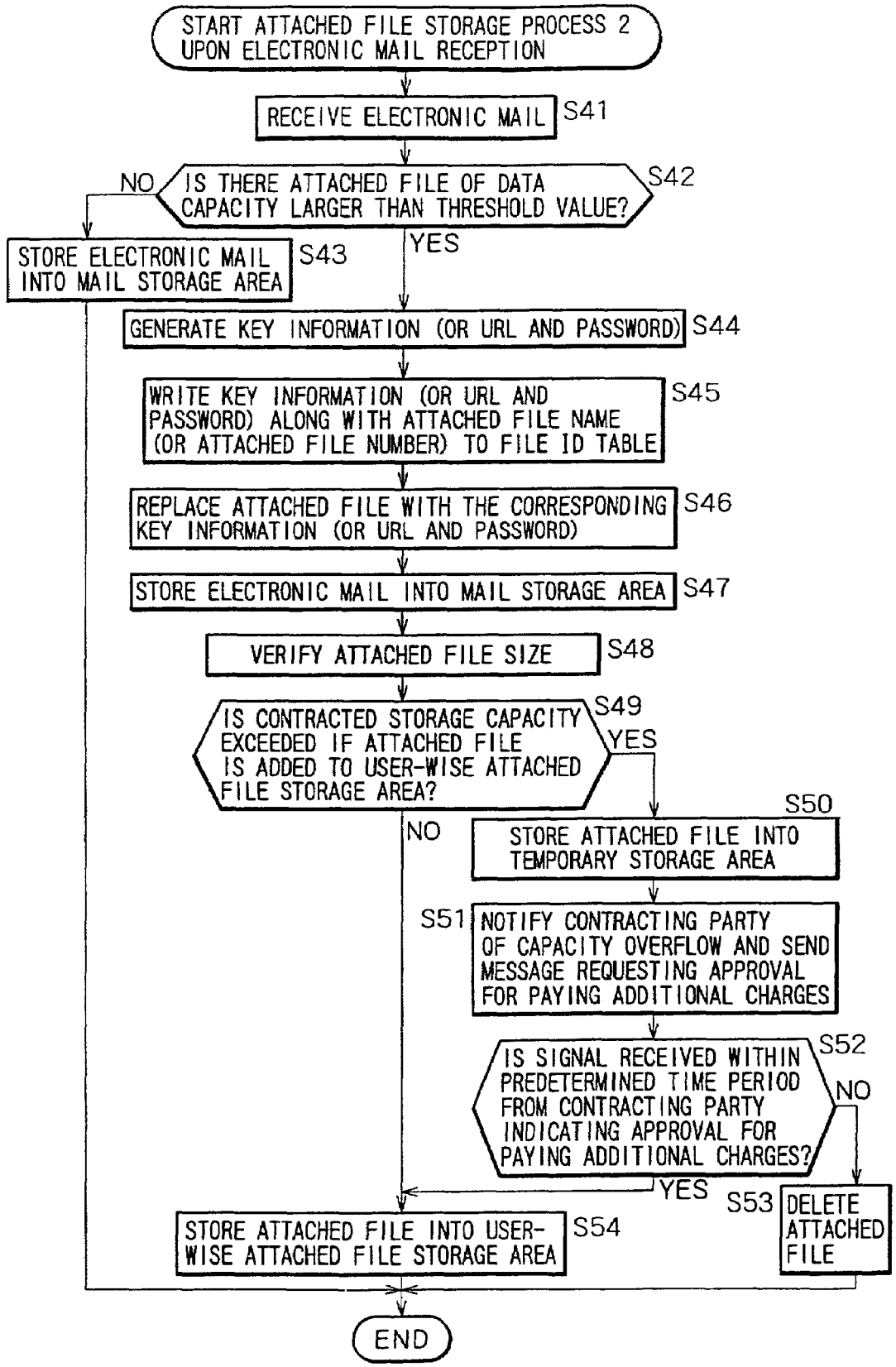
FIG. 10 is a flowchart of steps comprising another attached file storage process performed upon electronic mail reception.

If the information generated in steps S3 and S4 of FIG. 7, in steps S14 and S15 of FIG. 8, in steps S33 and S34 of FIG. 9, or in steps S45 and S46 of FIG. 10 to replace the attached file is key information, then the terminal equipment (e.g., any one of the portable data terminal 5 through the camera-equipped digital portable telephone 8 in FIG. 1) having received the electronic mail containing the key information in question may transmit both an attached file transfer request and the key information to the mail server 14 connected to the storage device 15 in which the attached file is stored. This allows the terminal equipment to receive the corresponding attached file. Attached files are transmitted and received a small capacity at a time.

Figure 11:
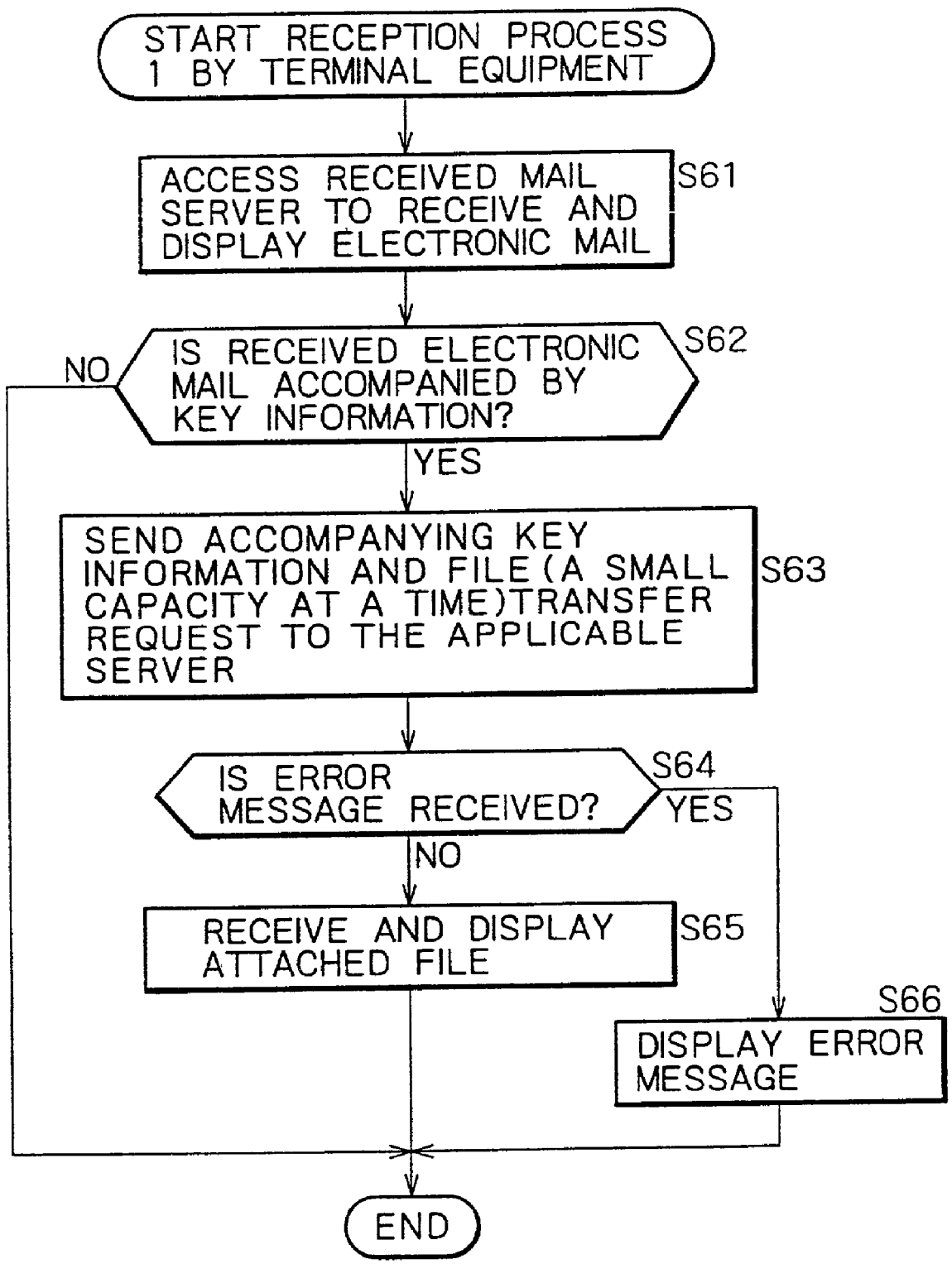
FIG. 11 is a flowchart of steps comprising a reception processes carried out by terminal equipment.

Described below with reference to a flowchart of FIG. 11 is a reception process (1) performed by the terminal equipment (e.g., camera-equipped digital portable telephone 7) having received electronic mail containing key information.

In step S61, the main controller 41 of the camera-equipped digital portable telephone 7 gains access to the mail server 14 (received mail server) via the modem 49, transmitter-receiver circuit 54, antenna 24, base station 3, public switched network 9, and access server 11 of the Internet service provider under contract. From the mail server 14, the main controller 41 receives electronic mail through the access server 11, public switched network 9, base station 3, antenna 24, transmitter-receiver circuit 54, and modem 49. The electronic mail thus received is sent through the LED controller 46 to the liquid crystal display 24 and displayed.

In step S62, the main controller 41 judges whether or not key information is attached to the electronic mail received in step S61. If in step S62 no key information is judged to be attached to the received electronic mail, the processing is terminated.

If in step S62 key information is judged attached to the received electronic mail, step S63 is reached. In step S63, the main controller 41 sends both the attached key information and an incremental file transfer request to one of two servers: to the mail server 14 (sent mail server) of the Internet service provider which sent the electronic mail received in step S61, if the processing of FIG. 7 or 8 has been carried out; or to the mail server 14 (received mail server) of the Internet service provider which has the receiving party's mailbox, if the processing of FIG. 9 or 10 has been executed. The key information and the transfer request are transmitted through the modem 49, transmitter-receiver circuit 54, antenna 24, base station 3, public switched network 9, and access server 11 of the applicable Internet service provider. The transfer request causes attached files to be transmitted in small increments.

In step S64, the main controller 41 judges whether or not any error message is received from the applicable mail server 14 through the public switched network 9, base station 3, antenna 24, transmitter-receiver circuit 54, and modem 49.

If in step S64 no error message is judged to be received, step S65 is reached. In step S65, the main controller 41 receives the attached file from the applicable mail server 14 through the access server 11, public switched network 9, base station 3, antenna 24, transmitter-receiver circuit 54, and modem 49. The attached file thus received is output through the LED controller 46 to the liquid crystal display 28 and displayed. This terminates the processing. If in step S64 an error message is judged to be received, step S66 is reached. In step S66, the main controller 41 outputs the received error message through the LED controller 46 to the liquid crystal display 28 for display thereon. The processing is then terminated.

In the processing of FIG. 11, when electronic mail having an attached file larger than a predetermined permissible capacity is sent to the camera-equipped digital portable telephone 7, the mail without the attached file is received first. Depending on the receiving party's need, the attached file is divided into data increments small enough to be receivable individually by the telephone 7. This makes it possible to forestall an overflow of a memory, not shown, in the camera-equipped digital portable telephone 7 and thereby avert the electronic mail from getting rejected due to an excess of data capacity. Furthermore, because key information is known only to the receiving party of the electronic mail in question, data security is maintained.

If the information generated in steps S3 and S4 of FIG. 7, in steps S14 and S15 of FIG. 8, in steps S33 and S34 of FIG. 9, or insteps S45 and S46 of FIG. 10 to replace the attached file comprising a URL and a password, then the terminal equipment (e.g., any one of the portable data terminal 5 through the camera-equipped digital portable telephone 8 in FIG. 1) having received the electronic mail containing the URL and password in question may gain access to a website content specified by the URL and, following input of the password, browse or download the applicable attached file.

Figure 12:
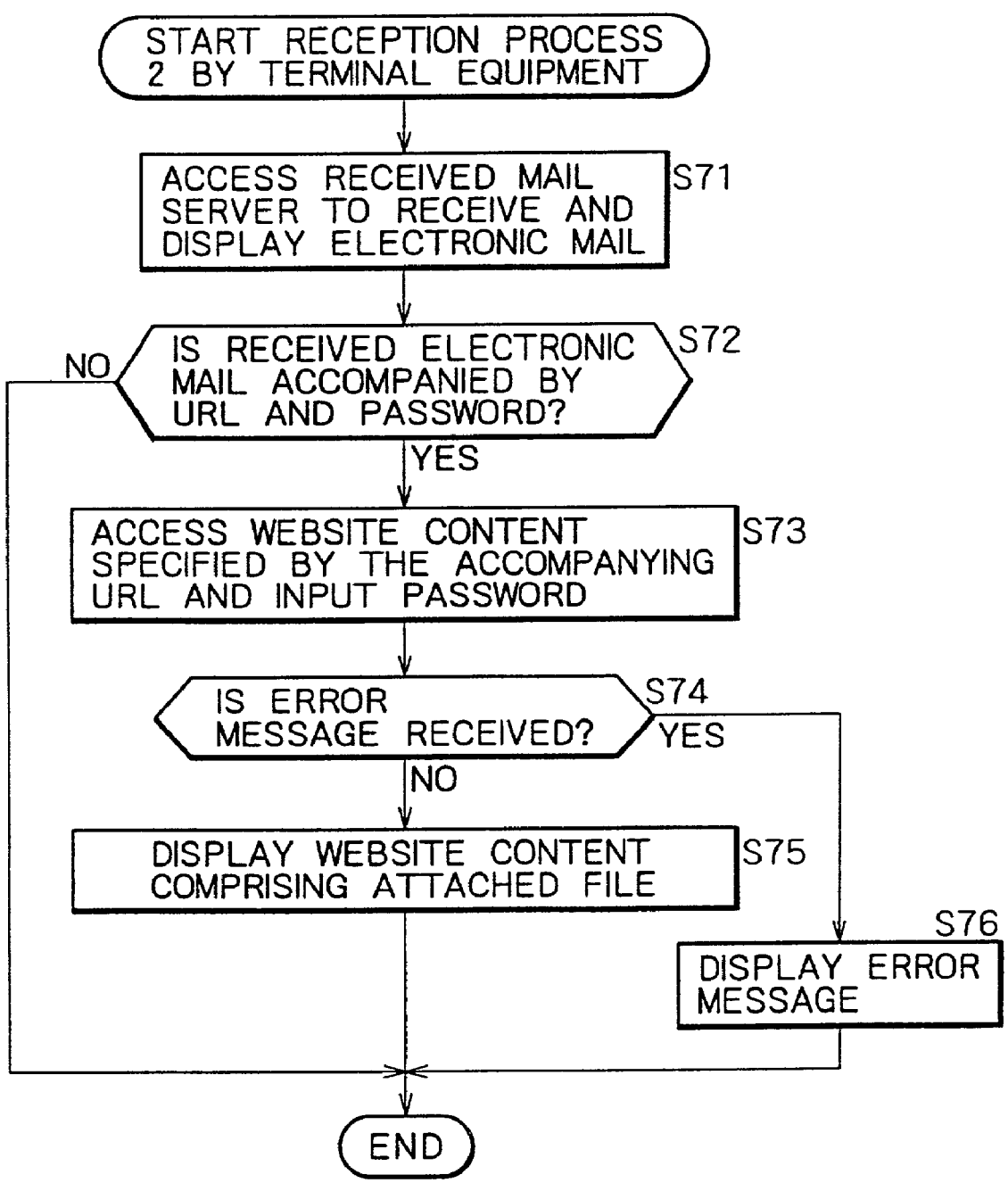
FIG. 12 is a flowchart of steps comprising another reception process carried out by terminal equipment.

Described below with reference to a flowchart of FIG. 12 is the reception process of (2) performed by the terminal equipment (e.g., camera-equipped digital portable telephone 7) having received electronic mail containing a URL and a password.

In step S71, the same process as that of step S61 in FIG. 11 is carried out.

In step S72, the main controller 41 judges whether or not the electronic mail received in step S71 is accompanied by a URL and a password. If in step S72 the received mail is not judged to have a URL or a password, the processing is terminated.

If in step S72 the received electronic mail is judged to be accompanied by a URL and a password, step S73 is reached. In step S73, the main controller 41 gains access to a website content specified by the accompanying URL in the content server 12 through the modem 49, transmitter-receiver circuit 54, antenna 24, base station 3, public switched network 9, and access server 11 of the Internet service provider corresponding to the URL in question. The main controller 41 outputs data representing a password input screen through the LED controller 46 to the liquid crystal display 28 to be displayed thereon. Given the password input screen on the liquid crystal display 28, the user enters the password into the screen by manipulating the operation keys 29. The main controller 41 receives input of a signal constituted by the user-input password via the operation input controller 43. The main controller 41 forwards the signal to the content server 12 through the modem 49, transmitter-receiver circuit 54, antenna 24, base station 3, public switched network 9, and access server 11 of the Internet service provider corresponding to the accompanying URL.

Although the user was described as inputting the password above, this is not limitative of the invention. Alternatively, the main controller 41 may automatically transmit the password accompanying the received electronic mail to the content server 12.

In step S74, the same process as that of step S64 in FIG. 11 is carried out. If in step S74 an error message is judged to be received, step S76 is reached. In step S76, the same process as that of step S66 in FIG. 11 is performed, and the processing is terminated. If in step S74 no error message is judged to be received, the data representing the attached file are displayed on the website content being accessed. In step S75, the main controller 41 causes the website content comprising display of the attached file to be output through the LED controller 46 to the liquid crystal display 28 for display. This terminates the processing.

In the processing of FIG. 12, when electronic mail having an attached file larger than a predetermined permissible capacity is transmitted to the camera-equipped digital portable telephone 7, the mail without the attached file is received first. Depending on the receiving party's need, the portable telephone 7 is allowed to access the website content comprising display of the attached file. This makes it possible to forestall an overflow of a memory, not shown, in the camera-equipped digital portable telephone 7 and thereby avert the electronic mail from getting rejected due to an excess of data capacity. Furthermore, because the URL and password are known only to the receiving party of the corresponding electronic mail, data security is maintained. If the applicable website content includes a key for permitting the data corresponding to the attached file to be downloaded, the receiving party may operate on the key to download the attached file as needed.

Figure 13:
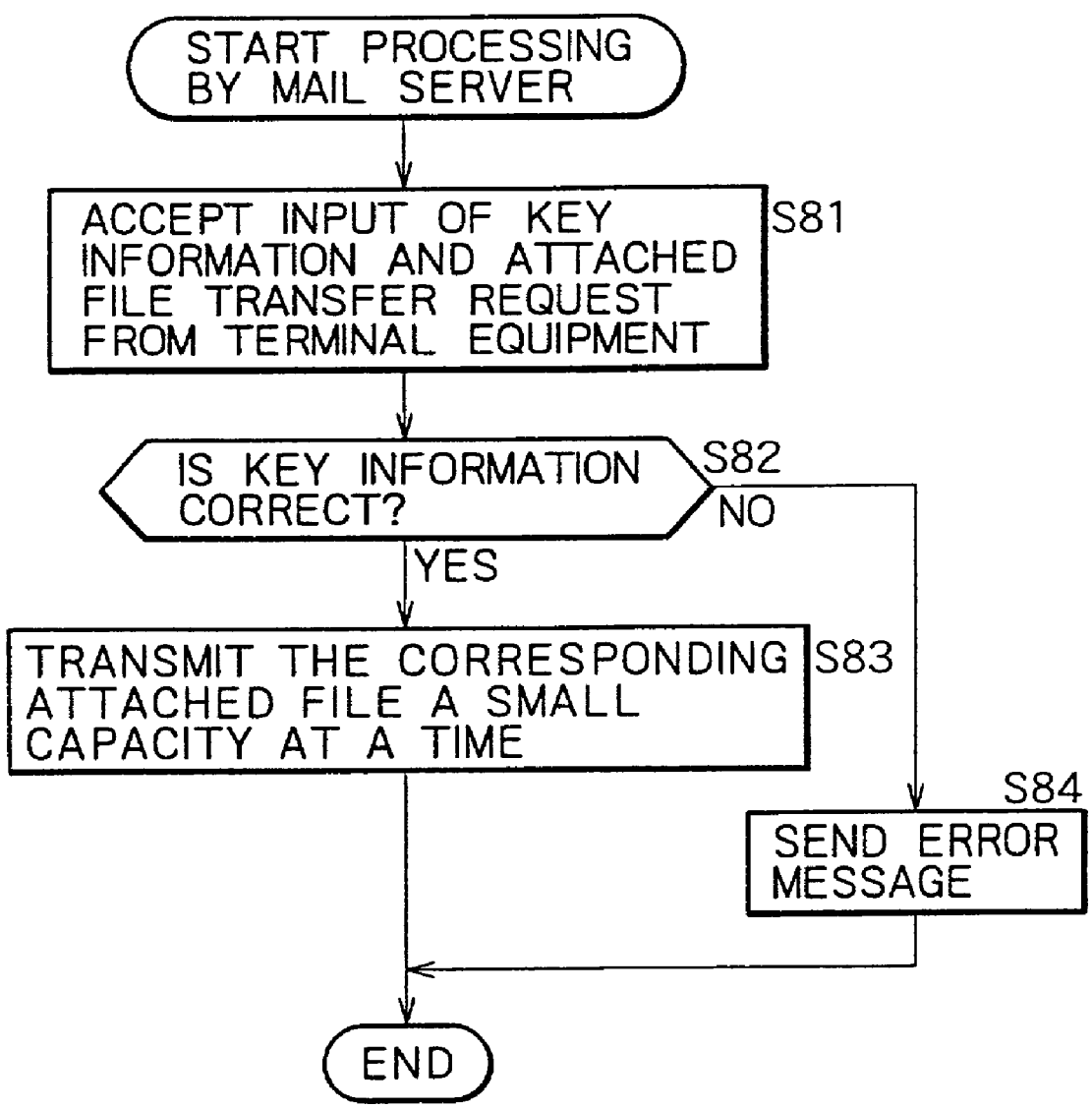
FIG. 13 is a flowchart of steps comprising a reception process performed by a mail server.

Described below with reference to a flowchart of FIG. 13 is a series of processes performed by the mail server 14 in parallel with the processing of FIG. 11.

In step S81, the CPU 61 of the mail server 14 receives input of key information and an attached file transmission request from the terminal equipment (e.g., any one of the portable data terminal 5 through the camera-equipped digital portable telephone 8 in FIG. 1) via the public switched network 9, access server 11, network interface 65, I/O interface 62, and internal bus 63. In step S82, the CPU 61 judges whether or not the key information is correct.

If in step S82 the key information is judged to be correct, step S83 is reached. In step S83, the CPU 61 reads the corresponding attached file from the user-wise attached file storage area in the storage device 15 via the internal bus 63, I/O interface 62, and network interface 65. The attached file thus read is transmitted a small capacity at a time to the terminal equipment that sent the key information in step S81. The file transmission is accomplished by way of the internal bus 63, I/O interface 62, network interface 65, access server 11, public switched network 9, and one of the base stations 1 through 4. The processing is then terminated.

If in step S82 the key information is not judged to be correct, step S84 is reached. Instep S84, the CPU 61 transmits an error message to the terminal equipment having sent the key information in step S81, through the internal bus 63, I/O interface 62, network interface 65, access server 11, public switched network 9, and one of the base stations 1 through 4. This terminates the processing.

Figure 14:
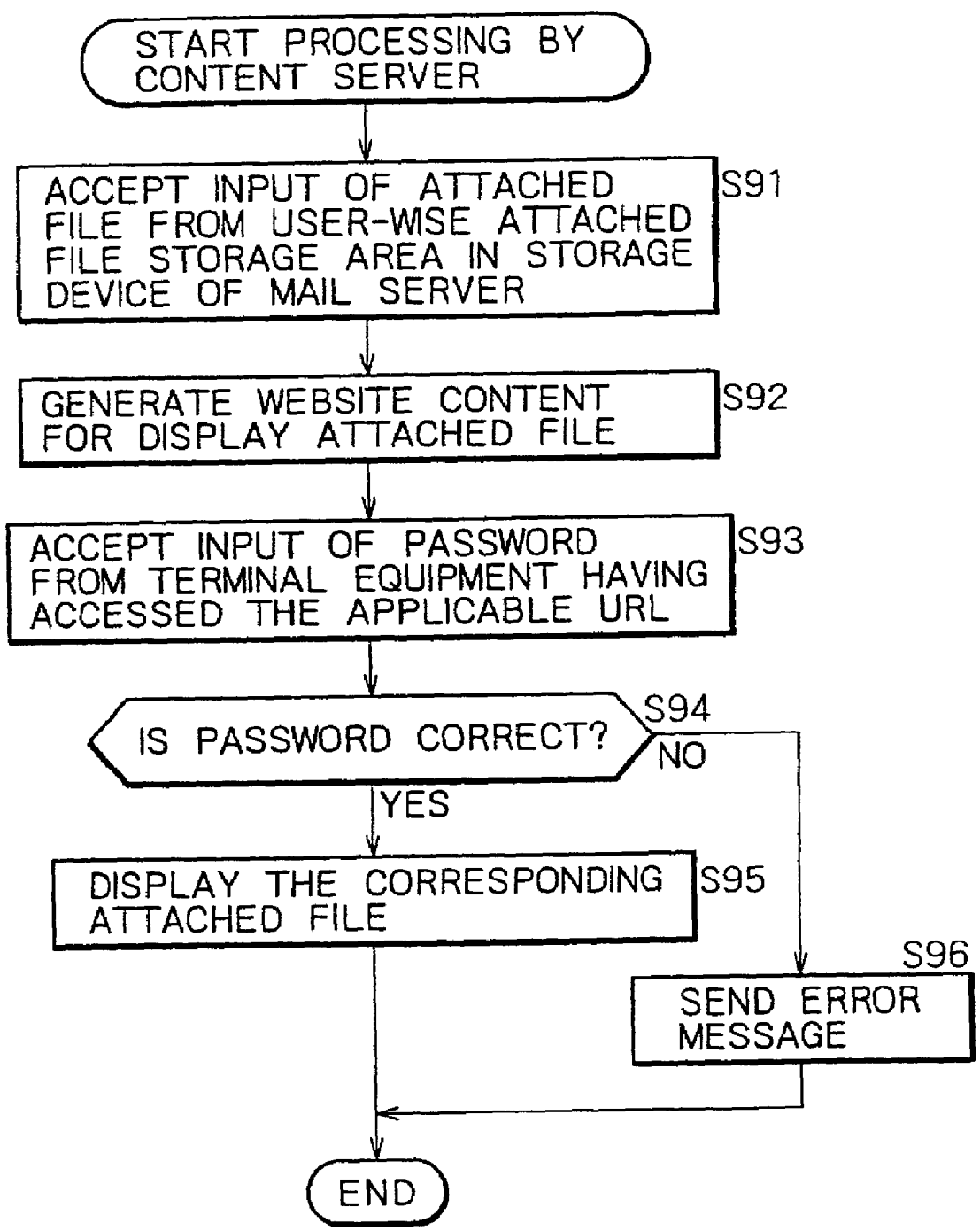
FIG. 14 is a flowchart of steps comprising a reception process executed by a content server.

Described below with reference to a flowchart of FIG. 14 is a series of processes performed by the content server 12 in parallel with the processing of FIG. 12.

In step S91, the CPU 61 of the content server 12 receives input of an attached file from the user-wise attached file storage area in the storage device 15 of the mail server 14 through the network interface 65, I/O interface 62, and internal bus 63. In step S92, the CPU 61 generates a website content for displaying the attached file.

In step S93, the CPU 61 receives input of a password from the terminal equipment (e.g., any one of the portable data terminal 5 through the camera-equipped digital portable telephone 8 in FIG. 1) via one of the base stations 1 through 4, public switched network 9, access server 11, network interface 65, I/O interface 62, and internal bus 63. In step S94, the CPU 61 judges whether or not the input password is correct.

If in step S94 the input password is judged to be correct, step S95 is reached. In step S95, the CPU 61 causes the attached file corresponding to the website content to be displayed. The processing is then terminated.

If in step S94 the input password is not judged to be correct, step S96 is reached. In step S96, the CPU 61 transmits an error message to the terminal equipment having input the password, through the internal bus 63, I/O interface 62, network interface 65, access server 11, public switched network 9, and one of the base stations 1 through 4. This terminates the pressing.

The website content generated in step S92 may include, for example, a key for permitting the data corresponding to the attached file to be downloaded. In such a setup, the user of the terminal equipment having accessed the website may operate the key to download the attached file as needed.

Programs for executing the series of steps described above may be installed upon use into the portable data terminal 5 through the camera-equipped digital portable telephone 8 or into the content server 12 through mail server 14 by means of suitable program storage media, such as package media including floppy disks, CD-ROMs (Compact Disc-Read Only Memories) and DVDs (Digital Versatile Discs); or semiconductor memories, magnetic disks and the like where the programs are stored temporarily or permanently (e.g., package media such as those shown in FIG. 5, offered to users apart from computers and comprised of the magnetic disk 71 (including floppy disks), optical disk 72 (including CD-ROMs and DVDs), magneto-optical disk 73 (including MD (Mini-Disk)), or semiconductor memory 74).

Alternatively, the programs for executing the series of steps described above may be retained on wired or wireless communication media such as local area networks (not shown), the Internet 10, or digital satellite broadcasting networks (not shown); or in diverse communication interfaces such as routers (not shown) and modems for transmitting or receiving the programs.

In the foregoing description, the portable data terminal 5 through the camera-equipped digital portable telephone 8, as well as the content server 12 through the mail server 14 have been shown representative of the information processing apparatus according to the invention. Alternatively, the invention may also be applied to various other information processing apparatuses such as general-purpose personal computers.

In this specification, the steps which are preserved on a program storage medium and which describe the programs to be executed represent not only processes that are carried out in the depicted sequence (i.e., on a time series basis) but also those that are conducted parallelly or individually.

In this specification, the term "system" refers to an entire configuration made up of a plurality of component devices.

While a preferred embodiment of the invention has been described using specific terms, such description is for illustrative purposes only, and it is to be understood that changes and variations may be made without departing from the spirit or scope of the following claims.

What is claimed is:

1. An information processing apparatus for controlling transmission and reception of electronic mail associated with a user, comprising:
    first input controlling means for controlling input of said electronic mail;
    first judging means for judging whether first information attached to said electronic mail has a capacity larger than a first predetermined capacity;
    generating means for generating second information corresponding to said first information, wherein said second information is authentication information;
    storage controlling means for, if said first judging means judges that said first information attached to said electronic mail has a capacity larger than said first predetermined capacity, controlling storage of said first information in association with said second information for the user, wherein said storage controlling means controls storage of said first information for a plurality of users;
    replacing means for replacing said first information attached to said electronic mail with said second information generated by said generating means;
    incrementing means for incrementing a counter value indicating a number of times the first judging means has judged that the capacity of said first information is larger than said first predetermined capacity for the user, wherein the incrementing means does not increment the counter value when the first judging means judges that the first information has a capacity smaller than the first predetermined capacity;
    first output controlling means for controlling output of said electronic mail after said first information has been replaced with said second information by said replacing means;
    third input controlling means for controlling input of said authentication information;
    third judging means for judging whether said authentication information is valid after input of said authentication information has been controlled by said third input controlling means; and
    third output controlling means for, if said third judging means judges said authentication information to be valid, controlling output of said first information controlled in storage by said storage controlling means, wherein said third output controlling means controls output of said first information in small increments; and
    second judging means for, if said first input controlling means controls input of said electronic mail together with said first information, judging whether or not a plurality of pieces of said first information destined for any one of said users have a total storage capacity larger than a second predetermined capacity.

2. An information processing apparatus according to claim 1, further comprising:
    second output controlling means for, if said second judging means judges that said plurality of pieces of said first information for one of said users has a total storage capacity larger than said second predetermined capacity, transmitting a query signal to said one of said users asking whether said first information is to be stored; and
    second input controlling means for receiving a storage designation signal designating storage of said first information,
    wherein said storage controlling means controls storage of said first information if, within a predetermined time period after said second output controlling means has transmitted said query signal, said second input controlling means receives said storage designation signal designating storage of said first information.

3. An information processing method for controlling transmission and reception of an electronic mail associated with a user, comprising:

controlling input of electronic mail;

judging whether first information attached to said electronic mail has a capacity larger than a first predetermined capacity;

generating second information corresponding to said first information, wherein said second information is authentication information;

controlling, if said first information attached to said electronic mail is judged to have a capacity larger than said first predetermined capacity in said judging step, storage of said first information in association with said second information for the user, wherein said step of controlling storage controls storage of said first information for a plurality of users;

replacing said first information attached to said electronic mail with said second information generated in said generating step;

incrementing a counter value indicating a number of times the capacity of said first information has been judged larger than the first predetermined capacity for the user, wherein the counter value is not incremented when the judging step judges that the first information has a capacity smaller than the first predetermined capacity;

controlling output of said electronic mail after said first information has been replaced with said second information in said replacing step;

controlling input of said authentication information;

judging whether said authentication information is valid after input of said authentication information has been controlled; and if said authentication information is judged to be valid, controlling output of said first information in small increments; and if said step of controlling input of electronic mail controls input of said electronic mail together with said first information, judging whether or not a plurality of pieces of said first information destined for any one of said users have a total storage capacity larger than a second predetermined capacity.

4. A program storage medium which stores a program causing an information processing apparatus to execute the steps of:

controlling input of electronic mail associated with a user;

judging whether first information attached to said electronic mail has a capacity larger than a first predetermined capacity;

generating second information corresponding to said first information, wherein said second information is authentication information;

controlling, if said first information attached to said electronic mail is judged to have a capacity larger than said first predetermined capacity in said judging step, storage of said first information in association with said second information for the user, wherein said step of controlling storage controls storage of said first information for a plurality of users;

replacing said first information attached to said electronic mail with said second information generated in said generating step;

incrementing a counter value indicating a number of times the capacity of said first information has been judged larger than the first predetermined capacity for the user, wherein the counter value is not incremented when the judging step judges that the first information has a capacity smaller than the first predetermined capacity;

controlling output of said electronic mail after said first information has been replaced with said second information in said replacing step;

controlling input of said authentication information;

judging whether said authentication information is valid after input of said authentication information has been controlled; and if said authentication information is judged to be valid, controlling output of said first information in small increments; and if said step of controlling input of electronic mail controls input of said electronic mail together with said first information, judging whether or not a plurality of pieces of said first information destined for any one of said users have a total storage capacity larger than a second predetermined capacity.

5. An information management system, comprising: a first information processing apparatus for controlling transmission and reception of electronic mail associated with a user; a second information processing apparatus connected to said first information processing apparatus for controlling the transmission and reception of said electronic mail; and a third information processing apparatus for transmitting and receiving said electronic mail, wherein said first information processing apparatus comprises:

input controlling means for controlling input of said electronic mail;

judging means for judging whether or not first information attached to said electronic mail has a capacity larger than a first predetermined capacity;

generating means for generating second information corresponding to said first information, wherein said second information is authentication information;

storage controlling means for, if said judging means judges that said first information attached to said electronic mail has a capacity larger than said first capacity, controlling storage of said first predetermined information in association with said second information and for the user, wherein said storage controlling means controls storage of said first information for a plurality of users;

replacing means for replacing said first information attached to said electronic mail with said second information generated by said generating means;

incrementing means for incrementing a counter value indicating a number of times the judging means has judged that the capacity of said first information is larger than said first predetermined capacity for the user, wherein the incrementing means does not increment the counter value when the judging means judges that the first information has a capacity smaller than the first predetermined capacity;

output controlling means for controlling output of said electronic mail after said first information has been replaced with said second information by said replacing means;

third input controlling means for controlling input of said authentication information;

third judging means for judging whether said authentication information is valid after input of said authentication information has been controlled by said third input controlling means; and third output controlling means for, if said third judging means judges said authentication information to be valid, controlling output of said first information controlled in storage by said storage controlling means, wherein said third output controlling means controls output of said first information in small increments; and fourth judging means for, if said input controlling means controls input of said electronic mail together with said first information, judging whether or not a plurality of pieces of said first information destined for any one of said users have a total storage capacity larger than a second predetermined capacity;

wherein said second information processing apparatus comprises:

reading controlling means for controlling reading, from said first information processing apparatus, of charge information about said first information controlled in storage by said storage controlling means; and computing means for computing charges for said user based on said charge information controlled in reading by said reading controlling means; and wherein said third information processing apparatus comprises:

reception controlling means for controlling reception of said electronic mail; and acquiring means for acquiring said second information from said electronic mail controlled by said reception controlling means, said second information being needed for access to said first information.

6. An information management system comprising: a first information processing apparatus for controlling transmission and reception of electronic mail associated with a user; and a second information processing apparatus for transmitting and receiving said electronic mail, wherein said first information processing apparatus compnses:

input controlling means for controlling input of said electronic mail;

judging means for judging whether first information attached to said electronic mail has a capacity larger than a first predetermined capacity;

generating means for generating second information corresponding to said first information, wherein said second information is authentication information;

storage controlling means for, if said judging means judges that said first information attached to said electronic mail has a capacity larger than said first predetermined capacity, controlling storage of said first information in association with said second information and for the user, wherein said storage controlling means controls storage of said first information for a plurality of users;

replacing means for replacing said first information attached to said electronic mail with said second information generated by said generating means;

incrementing means for incrementing a counter value indicating a number of times the judging means has judged that the capacity of said first information is larger than said first predetermined capacity for the user, wherein the incrementing means does not increment the counter value when the judging means judges that the first information has a capacity smaller than the first predetermined capacity;

output controlling means for controlling output of said electronic mail after said first information has been replaced with said second information by said replacing means;

computing means for computing charges for the user regarding said first information controlled in storage by said storage controlling means;

third input controlling means for controlling input of said authentication information;

third judging means for judging whether said authentication information is valid after input of said authentication information has been controlled by said third input controlling means; and third output controlling means for, if said third judging means judges said authentication information to be valid, controlling output of said first information controlled in storage by said storage controlling means, wherein said third output controlling means controls output of said first information in small increments; and fourth judging means for, if said input controlling means controls input of said electronic mail together with said first information, judging whether or not a plurality of pieces of said first information destined for any one of said users have a total storage capacity larger than a second predetermined capacity; and wherein said second information processing apparatus comprises:

reception controlling means for controlling reception of said electronic mail; and acquiring means for acquiring said second information from said electronic mail controlled by said reception controlling means, said second information being needed for access to said first information.

7. The information processing apparatus of claim 1, wherein said first output controlling means includes means for transmitting a portion of said first information together with said second information to a receiving device.

* * * * *